United States Patent [19]

Niu et al.

[11] Patent Number: 5,561,748
[45] Date of Patent: Oct. 1, 1996

[54] METHOD AND APPARATUS FOR CREATING SOLID MODELS FROM TWO-DIMENSIONAL DRAWINGS ON A GRAPHICS DISPLAY

[75] Inventors: Xingzhang F. Niu, Rosemead; Liangpin Chen, Monterey Park, both of Calif.

[73] Assignee: International Business Machines Corporation, Armonk, N.Y.

[21] Appl. No.: 148,015

[22] Filed: Nov. 3, 1993

Related U.S. Application Data

[63] Continuation of Ser. No. 618,138, Nov. 26, 1990, abandoned.

[51] Int. Cl.⁶ .................................................. G06F 15/60
[52] U.S. Cl. ..................................... 395/120; 395/141
[58] Field of Search ................................. 395/120, 122, 395/125, 119, 141; 340/723

[56] References Cited

U.S. PATENT DOCUMENTS

| | | | |
|---|---|---|---|
| 4,845,651 | 7/1989 | Aizawa et al. | 395/125 |
| 4,849,913 | 7/1989 | Ward et al. | 364/468 |
| 4,912,664 | 3/1990 | Weiss et al. | 364/577 |
| 4,933,865 | 6/1990 | Yamamoto | 382/16 |
| 4,962,472 | 10/1990 | Seki et al. | 364/900 |
| 5,027,292 | 6/1991 | Rossignac et al. | 395/122 |

OTHER PUBLICATIONS

"3D Solid Modeling Software Development for Industrial and Academic Purposes," J. Carlos Siska et al., *Computers & Graphics*, vol. 12, No. ¾, 1988, pp. 381–389.

*Primary Examiner*—Heather R. Herndon
*Assistant Examiner*—Michael S. Smith
*Attorney, Agent, or Firm*—David J. Kappos; Duke W. Yee; Andrew J. Dillon

[57] ABSTRACT

An improved apparatus and method for designing and displaying three dimensional solid representations from a two dimensional drawing. The invention prompts the user to select a two-dimensional view as a profile for extrusion. This is accomplished by selecting all the elements from a geometry to include in the extrusion. Thereafter, the user is prompted to select a front and back cutting face for the extrusion. The system thereafter transforms the selected two dimensional elements into three dimensional geometries.

8 Claims, 16 Drawing Sheets

SELECT FRONT FACE

SELECT PROFILE ON FRONT FACE

SELECT BACK FACE

SELECT PROFILE ON BACK FACE

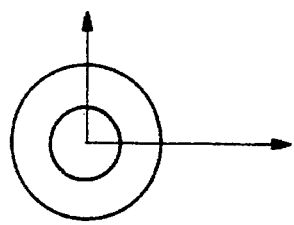
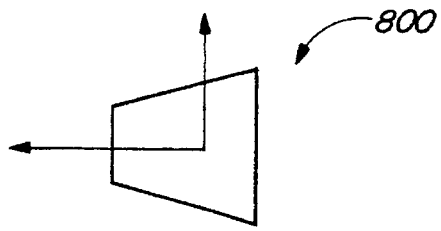
FIG._8A              FIG._8B
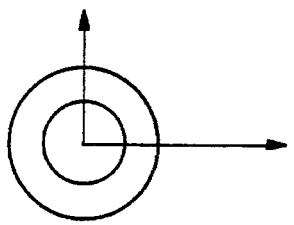
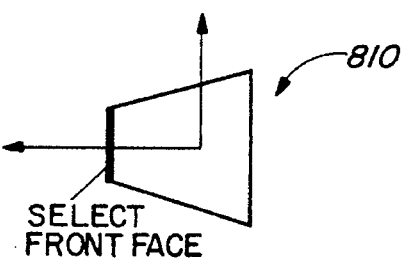
FIG._8C              FIG._8D
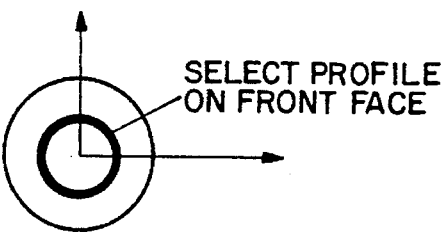
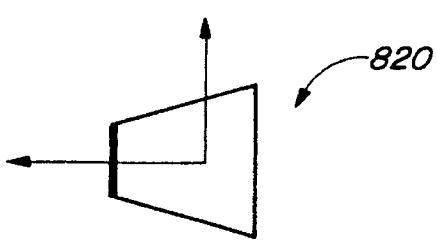
FIG._8E              FIG._8F
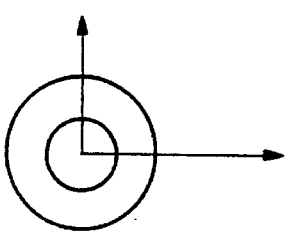
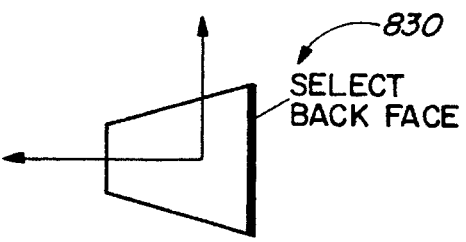
FIG._8G              FIG._8H
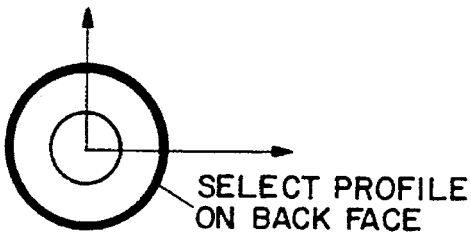
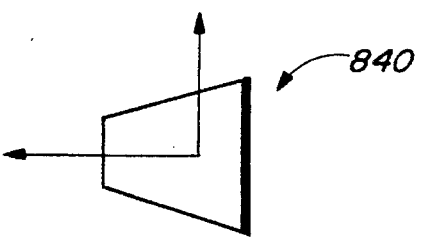
FIG._8I              FIG._8J

| SOLID FUNCTION: PARAMETRIC MODIFICATION | |
|---|---|
| PARAMETER FUNCTION MENU OPTIONS | |
| Def Parent  Def Offset  Chg Parm  Show All  Noshow | 1000 |
| MENU OPTIONS | FUNCTION |
| Def Parent | DEFINES A PLANE OF THE SOLID AS A PARENT PLANE. MUST BE PAIRED WITH A PARALLEL OFFSET PLANE WHOSE DISTANCE BETWEEN THE TWO PLANES IS THE DISTANCE YOU WANT TO MODIFY. — 1100 |
| Def Offset | DEFINES A PLANE OF THE SOLID PARALLEL TO THE PARENT PLANE AS AN OFFSET PLANE. MUST BE PAIRED WITH A PARALLEL DATUM PLANE FOR PARAMETRIC MODIFICATION. — 1120 |
| Chg Parm | DISPLAYS THE DISTANCE VALUE BETWEEN PAIRS OF PARENT AND OFFSET PLANES. — 1130 |
| Show All | DISPLAYS ALL NOSHOWN PLANES OF THE CURRENT SOLID. — 1140 |
| Noshow | TEMPORARILY SUPPRESSES THE DISPLAY OF A SELECTED PLANE OF THE CURRENT SOLID SO THAT THE HIDDEN PLANE CAN BE SELECTED. — 1150 |

FIG. 11

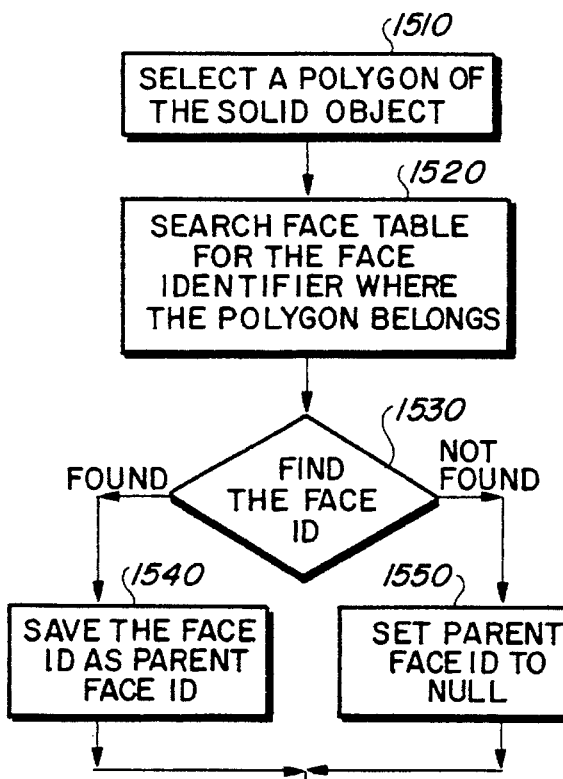
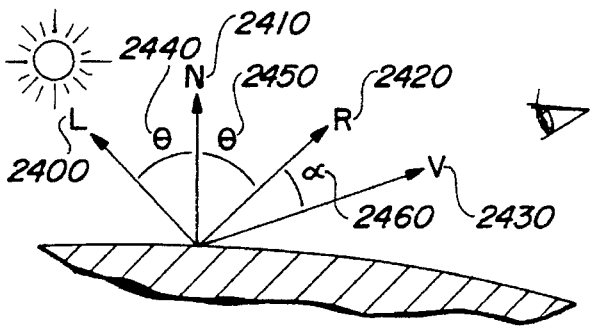
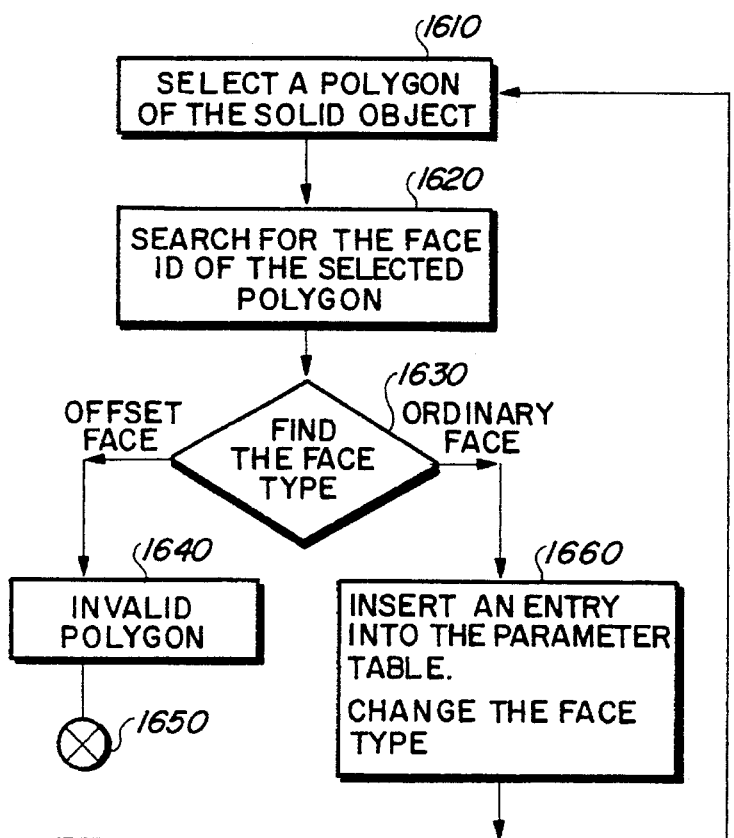

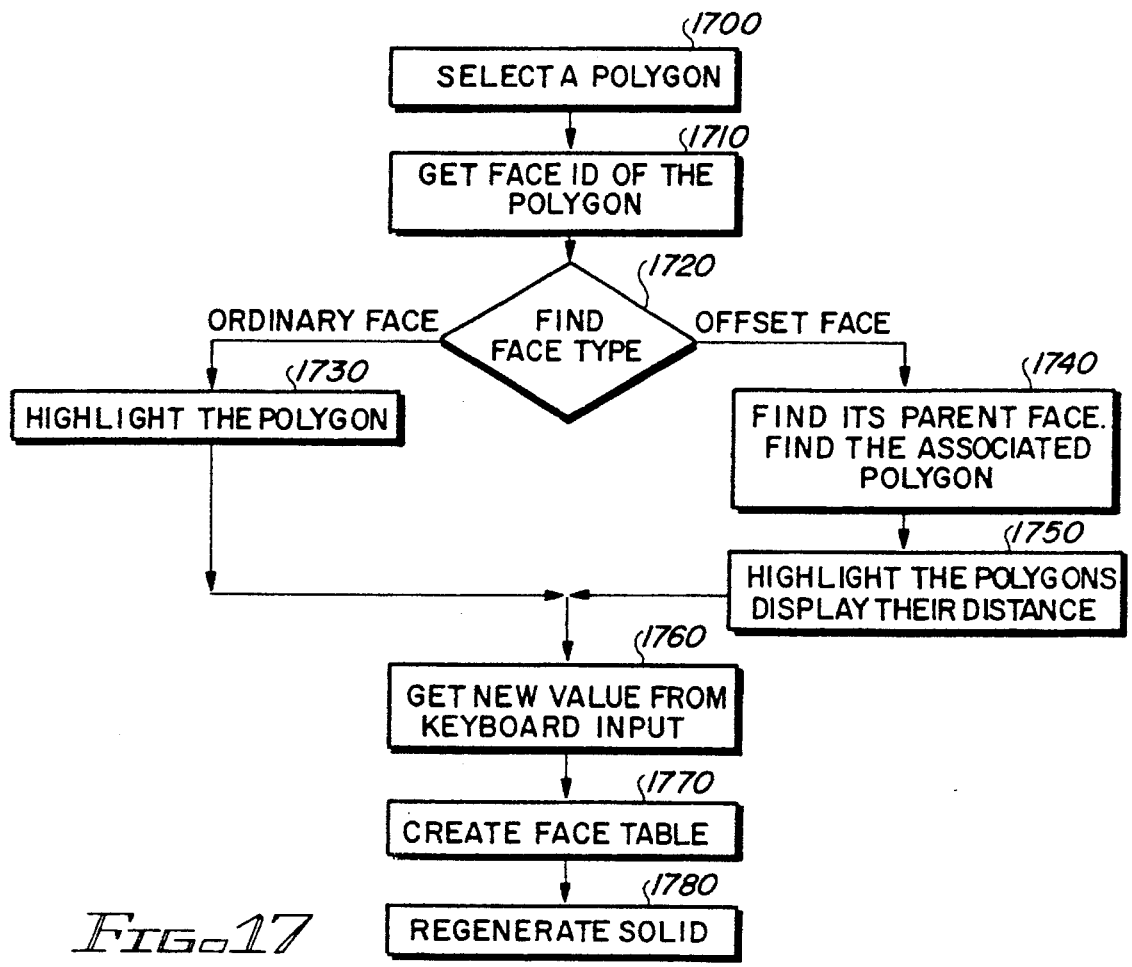
FIG. 17
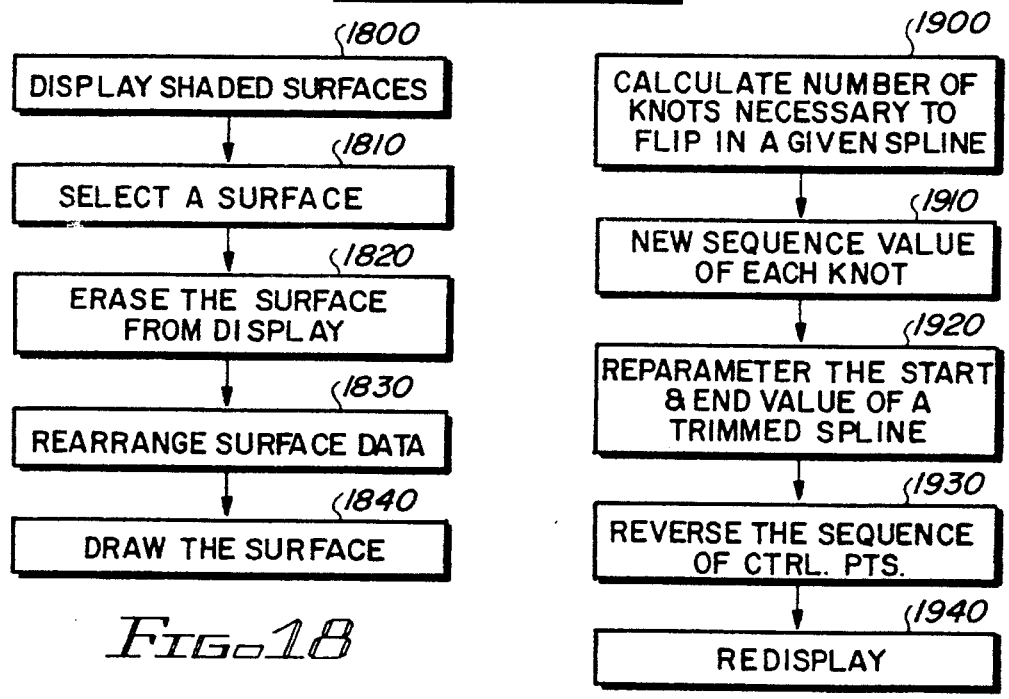
FIG. 18
FIG. 19

METHOD AND APPARATUS FOR CREATING SOLID MODELS FROM TWO-DIMENSIONAL DRAWINGS ON A GRAPHICS DISPLAY

This is a continuation, of application Ser. No. 07/618,138, filed Nov. 26, 1990, now abandoned.

FIELD OF THE INVENTION

This invention generally relates to improvements in computer aided design (CAD) systems and more particularly to an enhanced method and apparatus for generating solid representations on a graphic display.

BACKGROUND OF THE INVENTION

This application is related to the following co-pending applications owned by the same assignee:

METHOD AND APPARATUS FOR GENERATING THREE DIMENSIONAL DRAWING ON A GRAPHICS DISPLAY, 07/618,187;

METHOD AND APPARATUS FOR SHADING SURFACES OF A THREE DIMENSIONAL DRAWING, 07/617,705;

ENHANCED MULTIDIMENSIONAL DESIGN KEYBOARD, 07/617,830.

In CAD applications, it is important to be able to transform two-dimensional representations of objects into solid representations. The automobile and aircraft industries were two of the first to exploit this function for mechanical assemblies. Examples of general CAD systems are disclosed in U.S. Pat. Nos. 4,962,472; 4,849,913; and 4,912,664. Three basic techniques were developed for transforming two dimensional representations into three dimensional, solid models.

The first basic technique is primitive instancing. In primitive instancing, the modeling system defines a set of primitive, three dimensional solid shapes that are appropriate for the particular application. For example, a primitive object may be a regular pyramid with a user-defined number of faces meeting the apex. Primitive instances are similar to parametized objects, except the objects are solids. A parametized primitive may be thought of as defining a family of parts whose members vary in a few parameters. These family of parts are referred to as group technology.

Primitive instancing is often used for relatively complex objects, such as gears or bolts, that are tedious to define in terms of Boolean combinations of simpler objects. A gear or bolt can be defined in terms of its diameter and number of teeth. In primitive instancing, no provisions are made for combining objects to form a new, higher-level object. Thus, the only way to create a new kind of object is to write the code that defines the new object. This is not a practical approach to object creation in an interactive CAD package.

Sweeping an object along a trajectory path through space defines a new object called a sweep. The simplest kind of a sweep is defined by a two dimensional area swept along a linear path normal to the plane of the area to create a volume. This technique is known as a translational sweep or extrusion. It is one of the most common techniques for representing objects made by extruding metal or plastic through a die with the desired cross-section. In this simple case, each sweep's volume is simply the sweep object's area times the length of the sweep. The problem with this technique is that the user can only specify a single two dimensional representation to use in generating the solid.

The final prior art technique for generating solids is constructive solid geometry. In constructive solid geometry, simple primitives are combined by means of regularized Boolean set operators that are included directly in the representation. An object is stored as a tree with operators at the internal nodes and simple primitives as the leaves. Some nodes represent Boolean operators, whereas others perform translation, rotation and scaling.

To determine physical properties or to display the solid, the properties of the leaves must be combined to obtain the properties of the root. The complexity of this task depends on the representation in which the leaf objects are stored and on whether a full representation of the composite object at the tree's root must actually be produced. This pre-defined approach to defining a solid model is unacceptable in a system whereby a user can dynamically design and modify two dimensional representations and thereafter create three dimensional solid representations.

SUMMARY OF THE INVENTION

It is thus an object of this invention to provide an improved apparatus end method for designing and displaying three dimensional solid representations from a two dimensional drawing. The invention provides two operations to generate three dimensional solid objects from two dimensional representations of the objects. The operations are extrusion and taper. The operation of extrusion prompts the user to select geometries from a two dimensional view as a profile for input to the extrusion operation.

This is accomplished by selecting all necessary two dimensional elements from the view to include in the extrusion. Thereafter, the user is prompted to select a front and back cutting face for the extrusion. The front and back cutting faces are defined in two dimensional views other than the profile view. The system thereafter transforms the selected two dimensional elements into three dimensional geometries, and inputs them into the solid modeler for further generation of a solid object on the display.

The operation of the taper function begins by a user selecting an element from one, two dimensional view as a front cutting face. Then, the user selects geometries in other views that define the first profile on the front cutting face for taper. The profile is defined by selecting all the necessary geometries in the view to form a closed boundary. By performing the same operational sequences, the user can define the back cutting face and second profile by selecting geometries in different views. The system thereafter transforms the front and back cutting faces and the two profiles into three dimensional geometries and inputs them into the solid modeler to generate a solid object.

BRIEF DESCRIPTION OF THE DRAWING

FIG. 7 is an illustration of a step used to generate a tapered solid in accordance with the present invention;

FIGS. 8A–8K are an illustration of a set of steps used to generate a tapered solid in accordance with the present invention;

FIG. 11 is an illustration of the parameter function menu options in accordance with the present invention;

FIG. 15 is a flowchart of the logic implementing the defining a parent face in accordance with the subject invention;

FIG. 16 is a flowchart of the logic implementing the defining an offset face in accordance with the subject invention;

FIG. 17 is a flowchart of the logic implementing the Change parameter function in accordance with the subject invention;

FIG. 18 is a flowchart depicting the logic of the shading surface normal in accordance with the subject invention;

FIG. 19 is a flowchart depicting the logic of the rearranging surface data in accordance with the subject invention;

FIG. 24 is an illustration of diffracted light from a display in accordance with the subject invention.

DETAILED DESCRIPTION OF THE INVENTION

Figure 1:
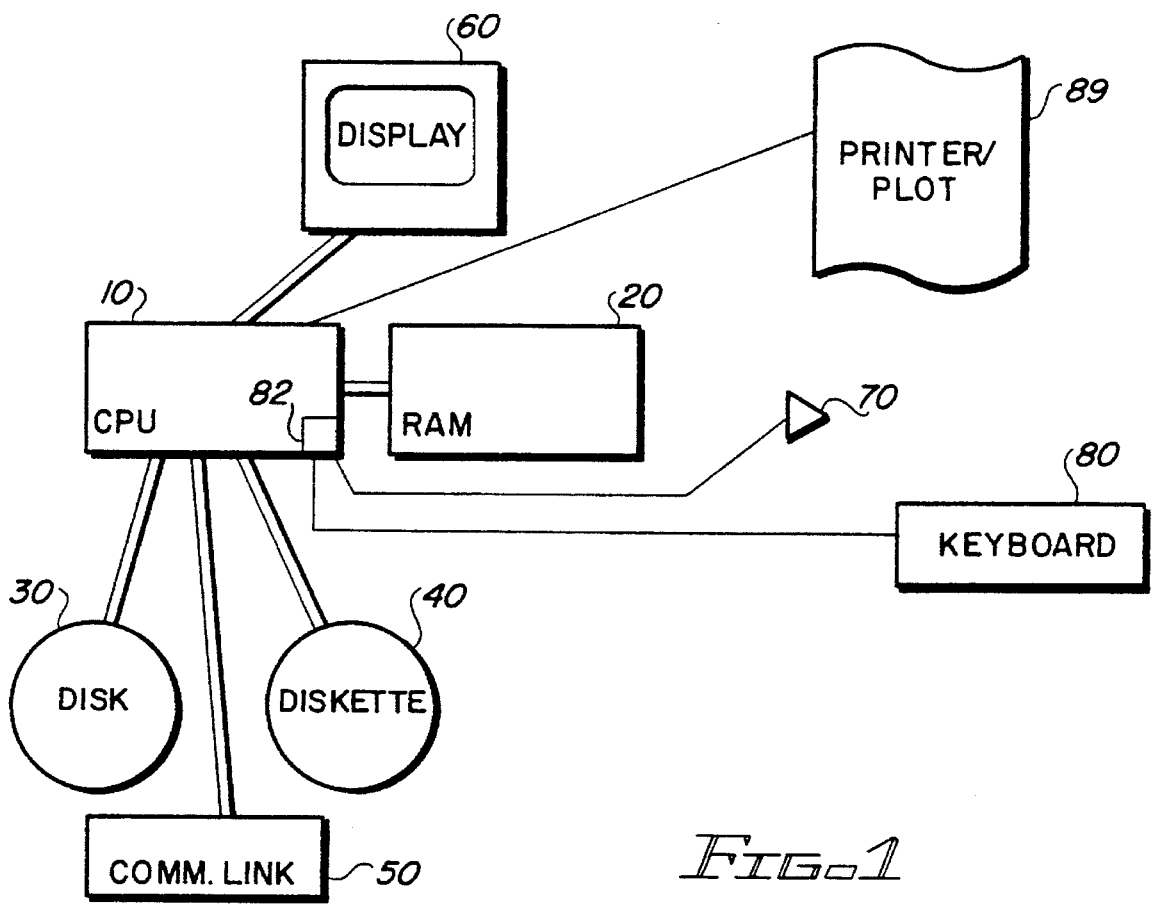
FIG. 1 is a block diagram of a computer in accordance with the present invention.
Figures 7, 8K:
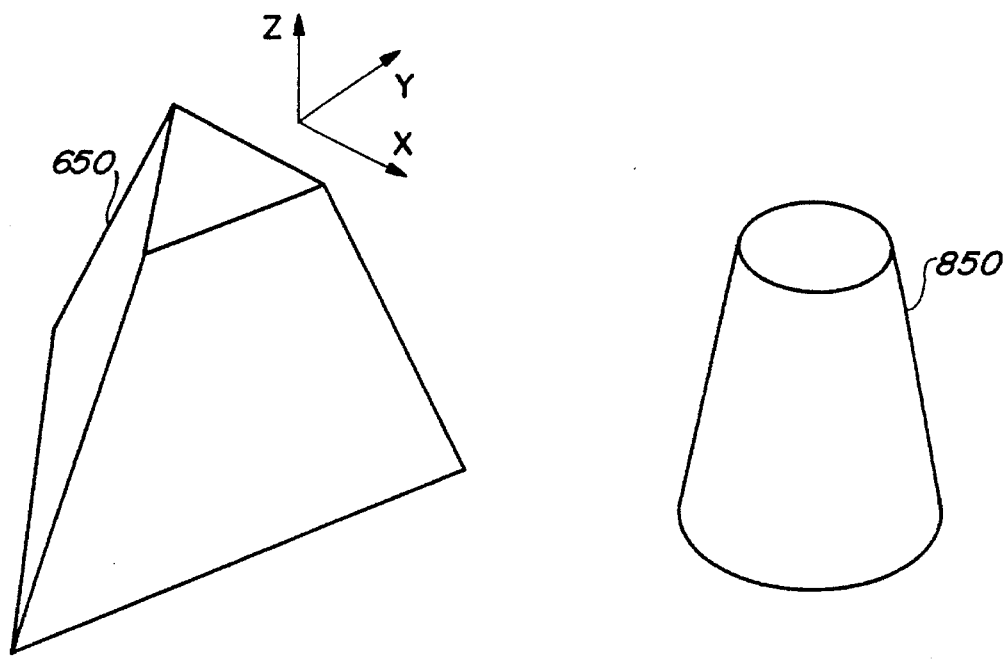

With reference to FIG. 1, the apparatus of the subject invention is a standard microprocessor such as that marketed by IBM under the product name of PS/2. The CPU 10 can be an 80386 or 80486 processor for example. The CPU 10 has Direct Memory Access (DMA) to the RAM 20, Disk 30 and Diskette 40. The CPU 10 can also transmit information via the Communication Link 50.

The CPU 10 also communicates to an attached graphic display to display information in EGA, VGA or other higher resolution modes. A mouse 70 is an optional cursor pointing device that is used to supplement the arrow keys of the keyboard 80 for specifying precise pointings on the graphic display 60. The keyboard is controlled by a keyboard adapter 82, including buffer means, in the CPU 10. Finally, a printer or plotter 89 can be attached to the CPU 10 to generate hardcopy of drawings.

The software used to awake the unique hardware features of this invention resides on the Disk 30 as do the drawings generated by a designer employing the invention. The software is also responsible for translating signals from the mouse/keyboard into appropriate system actions.

Figures 2, 3:
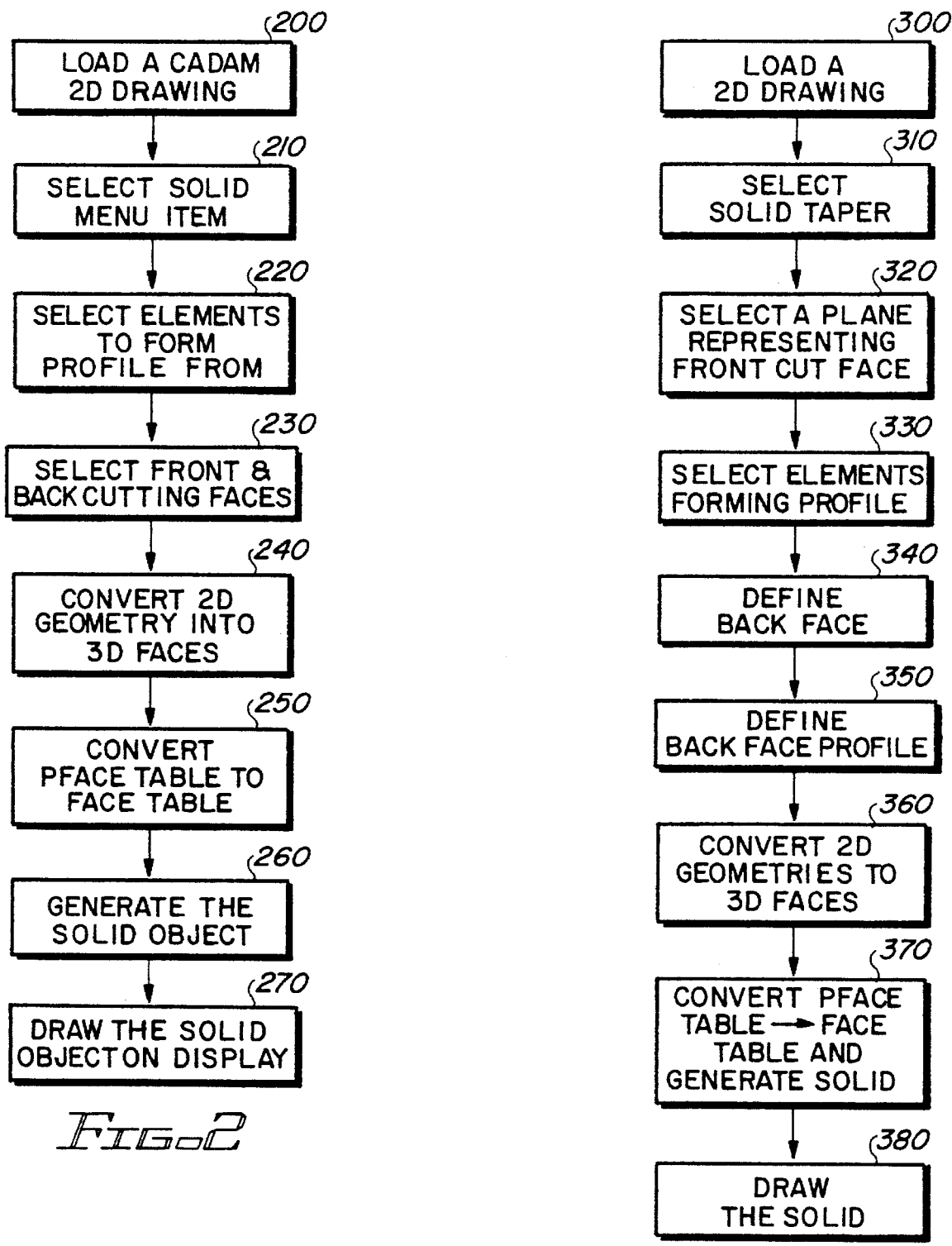
FIG. 2 is a flow chart of the solid logic in accordance with the present invention.
FIG. 3 is a flow chart of the solid logic for a tapered solid in accordance with the present invention.
Figure 4A:
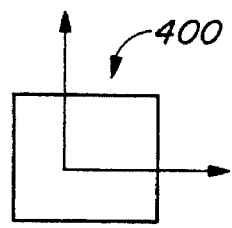
FIGS. 4A–4I are an illustration of the steps used to generate an extruded solid in accordance with the present invention.
Figure 4B:
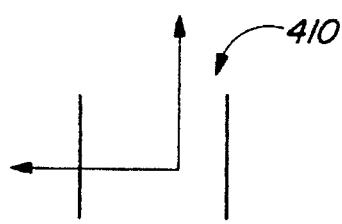
Figure 4C:
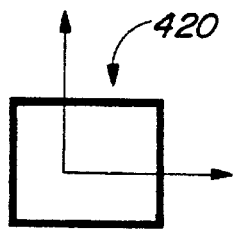
Figure 4D:
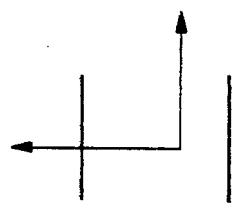
Figure 4E:
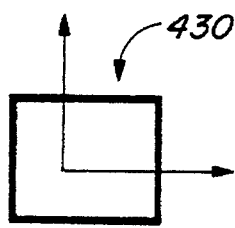
Figure 4F:
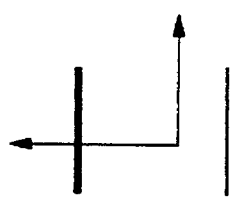
Figure 4G:
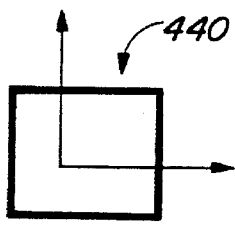
Figure 4H:
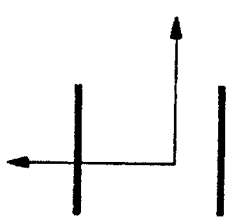
Figure 4I:
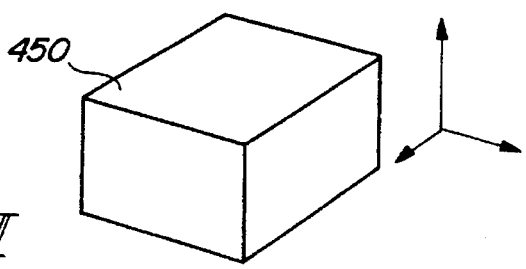
Figure 5A:
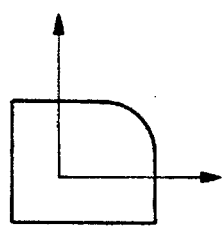
FIGS. 5A–5I are an illustration of the steps used to generate an extruded solid in accordance with the present invention.
Figure 5B:
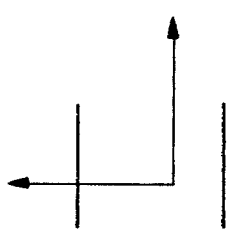
Figure 5C:
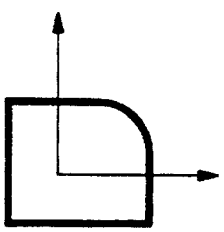
Figure 5D:
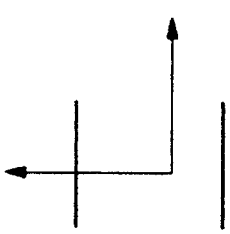
Figure 5E:
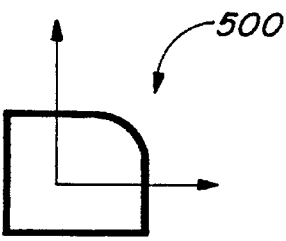
Figure 5F:
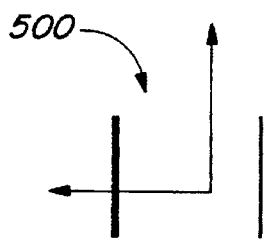
Figure 5G:
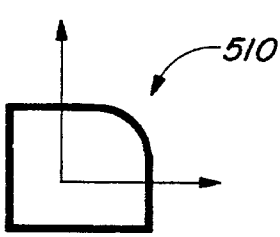
Figure 5H:
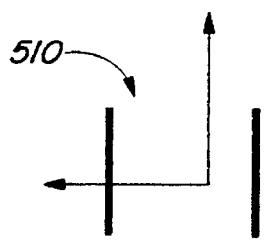
Figure 5I:
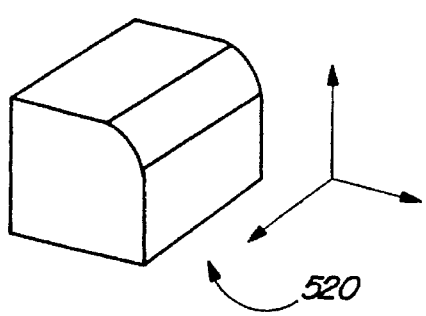
Figure 6A:
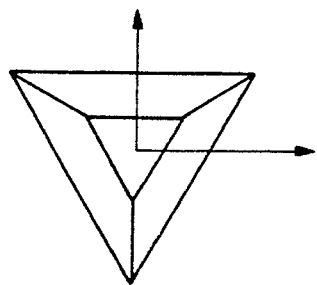
FIGS. 6A–6I are an illustration of the steps used to generate a tapered solid in accordance with the present invention.
Figure 6B:
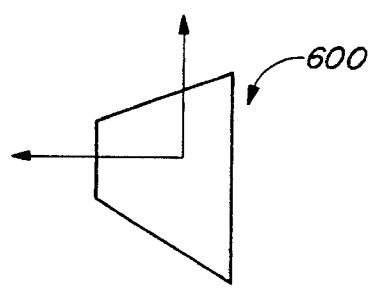
Figure 6C:
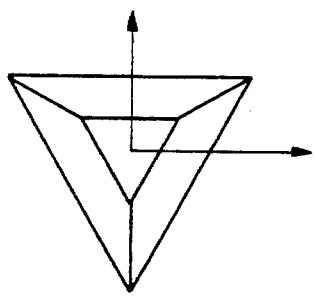
Figure 6D:
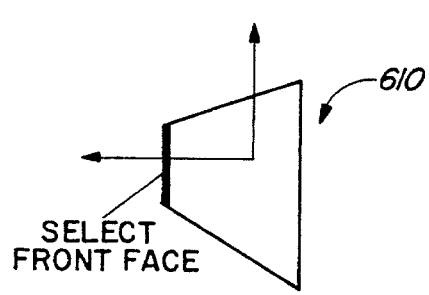
Figure 6E:
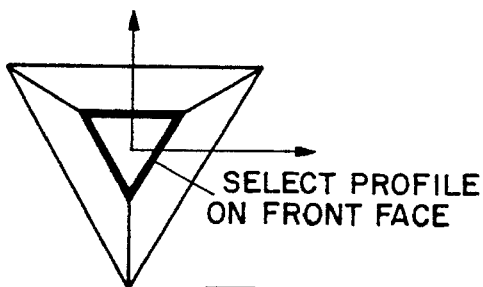
Figure 6F:
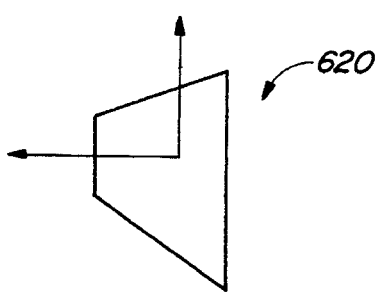
Figure 6G:
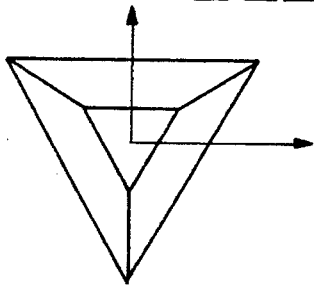
Figure 6H:
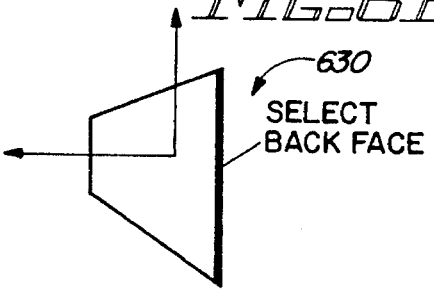
Figure 6I:
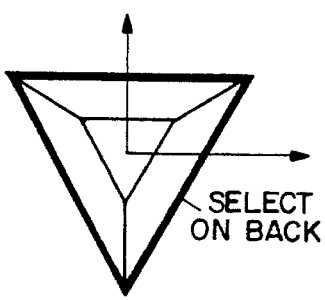
Figure 6J:
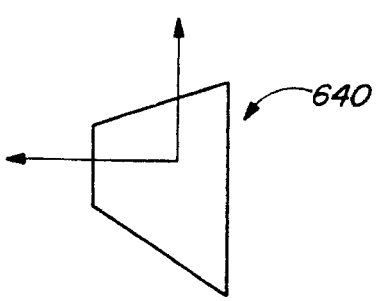

FIG. 2 is a flowchart representing the logic in accordance with the invention. To generate a solid from a two dimensional drawing, the drawing is first loaded into the computer memory as shown in function block 200. The drawing should contain multiple two dimensional views of an object. The user then selects the appropriate menu selection item as depicted in input block 210. Then, the user selects elements to form a profile for the extrusion operation as depicted in input block 220. The elements are lines and circles on the two dimensional views from which to generate the solid model. The pointers to the selected elements are stored in the data structure set forth in Appendix 1.

The geometric elements are selected in a clockwise or counter-clockwise sequence. When all of the necessary elements have been selected, then menu item END is selected to indicate completion. The data structure is used to store this information in a manageable fashion for further processing in accordance with the subject invention.

The user selects front and back cutting faces by selecting lines in the views other than the profile view as depicted in input block 230. Next, the selected two dimensional elements are converted into three dimensional geometries as set forth in input block 240. So, for example, a line becomes an unbounded plane, a circle becomes an unbounded cylinder, and a spline becomes a ruled face. The faces are stored in the PFace data structure set forth in Appendix 2.

A Face Table is a list of faces that form the boundary of a solid. The Face Table contains plane, cylinders and free form surface information. The Face Table serves as an interface between parametric design and the solid modeler. A PFace Table is a particular face table used for parametric design. It contains parameterized faces, a parameter table and a construction list for building a solid from the faces. A construction list contains a description of how each part of the solid is created and what faces are used to form the component.

The next step converts the PFace data structure to a Face data structure for input into the solid modeler. The Face data structure is set forth in Appendix 3.

Then, the Face data structure is input into the solid modeler to perform the extrusion taper operation as illustrated in function block 260. The data structure shown in Appendix 4 is used in the performance of this task.

Finally, the solid object is displayed on the graphics display as shown in output block 270. The listing shown in Appendix 5 is the source code used to implement the various transformations and display of graphic information.

An alternative embodiment of the invention allows a tapered display of a solid object to be created. The logic implementing this function is set forth in FIG. 3. The initial steps set forth in function block 300 are identical to the solid generation discussed above. A two dimensional drawing is loaded. The user selects the solid taper menu function in input block 310. Then, the user is prompted to select a plane representing the front cut face as shown in input block 320. This is done by positioning the cursor on lines other than the profile view. Next, the user is prompted to select elements forming a profile of the front face as shown in input block 330. The user selects the necessary two dimensional geometries in the profile view to form a profile for taper. Then the end menu is selected to indicate completion of profile processing.

Input block 340 depicts the user selection of the back face as the next step. The user selects lines in views other than the profile view to form a profile for the taper operation as shown in input block 350. When the selection process is complete, the end menu item is selected. Then, in function block 360, the two dimensional geometries are converted to three dimensional faces as depicted in function block 370 and a solid representation is generated. This processing includes conversion of the two dimensional geometries to three dimensional geometries and the corresponding conversion of data structures as discussed above. Finally, the solid is displayed as depicted in output block 380. The data structure shown in Appendix 6 is used to store the solid object for subsequent display.

In FIGS. 4, 5, 6, 7 and 8, examples of solid generations employing the subject invention are illustrated. In FIG. 4, a front view and a side view of a two dimensional object are presented at label 400 and 410. To generate a solid rendition of the two, two dimensional views, the user initially selects the four lines as the profile for extrusion on the front face at label 420. Next, the back face is selected from the side view as indicated at label 430, and finally, four lines of the back face are selected to form the profile as shown at label 440. This information is used to generate a three dimensional solid object as illustrated at label 450.

FIG. 5 is another example of an extrusion. First, three lines and an arc are selected as a profile for extrusion as depicted at label 500. Then, two lines from a side view are selected to complete the operation as shown at label 510. The solid object is then generated as shown at label 520.

FIG. 6 is another illustration of a solid generation. Again, two, two dimensional drawings are initially loaded add displayed as illustrated at label 600. Then, the front face of one of the two dimensional drawings is selected as shown at label 610. The profile for the front face is selected next as depicted at label 620. Next, a back face is selected as shown at label 630. Finally, the profile for the back face is selected as illustrated at label 640, and the three dimensional solid is generated as illustrated at label 650 in FIG. 7.

FIG. 8 illustrates a circular extrusion. Two views of the object are initially drawn as illustrated at label 800. Then, a front face is selected as noted at label 810. Next, the front face profile is selected as illustrated at label 820. Finally, the back face is selected at label 830, and the profile of the back face is also selected as illustrated at label 840. The resultant solid is displayed as shown at label 850.

Figure 9:
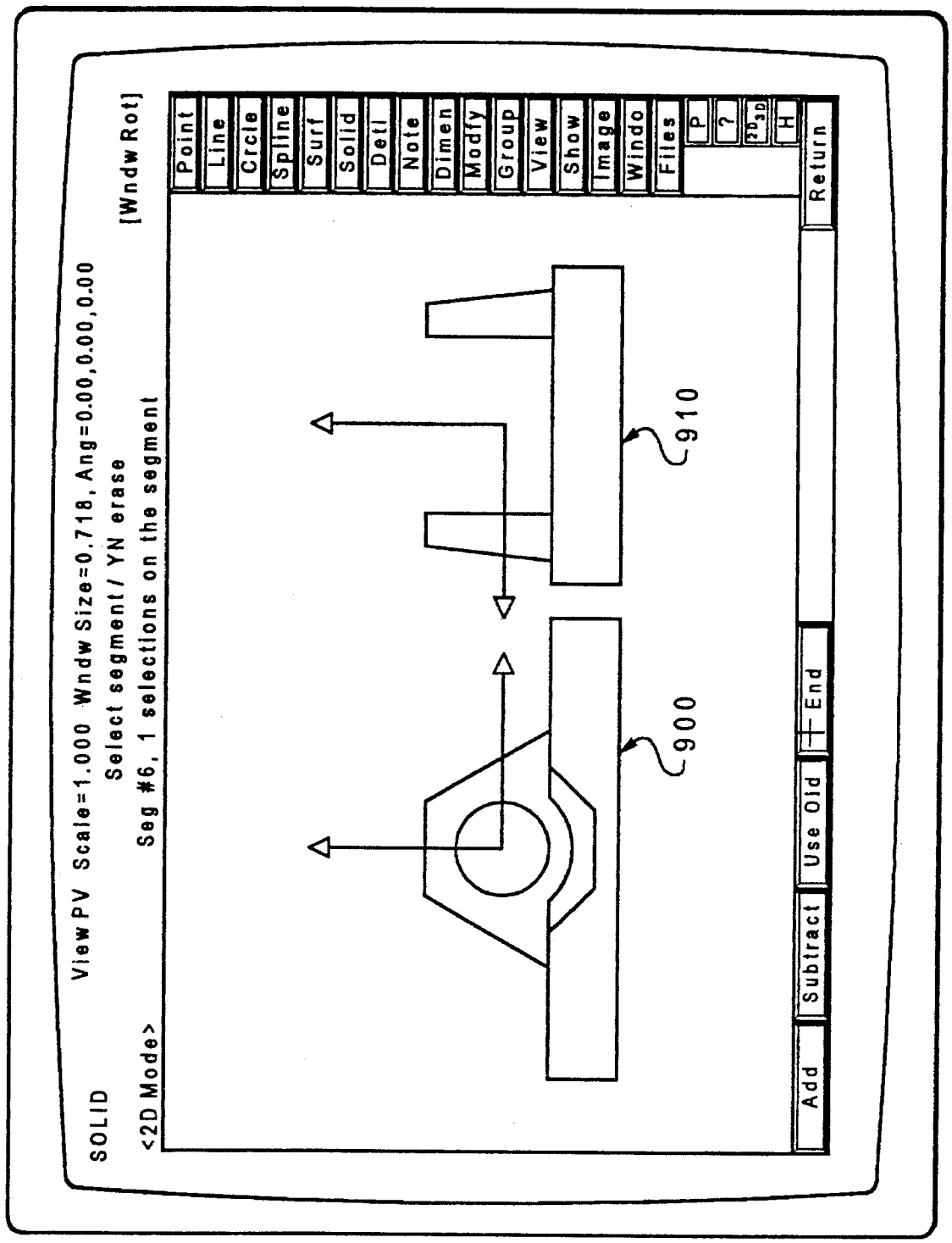
FIG. 9 is an illustration of a pair of two dimensional drawings in accordance with the present invention.
Figure 10:
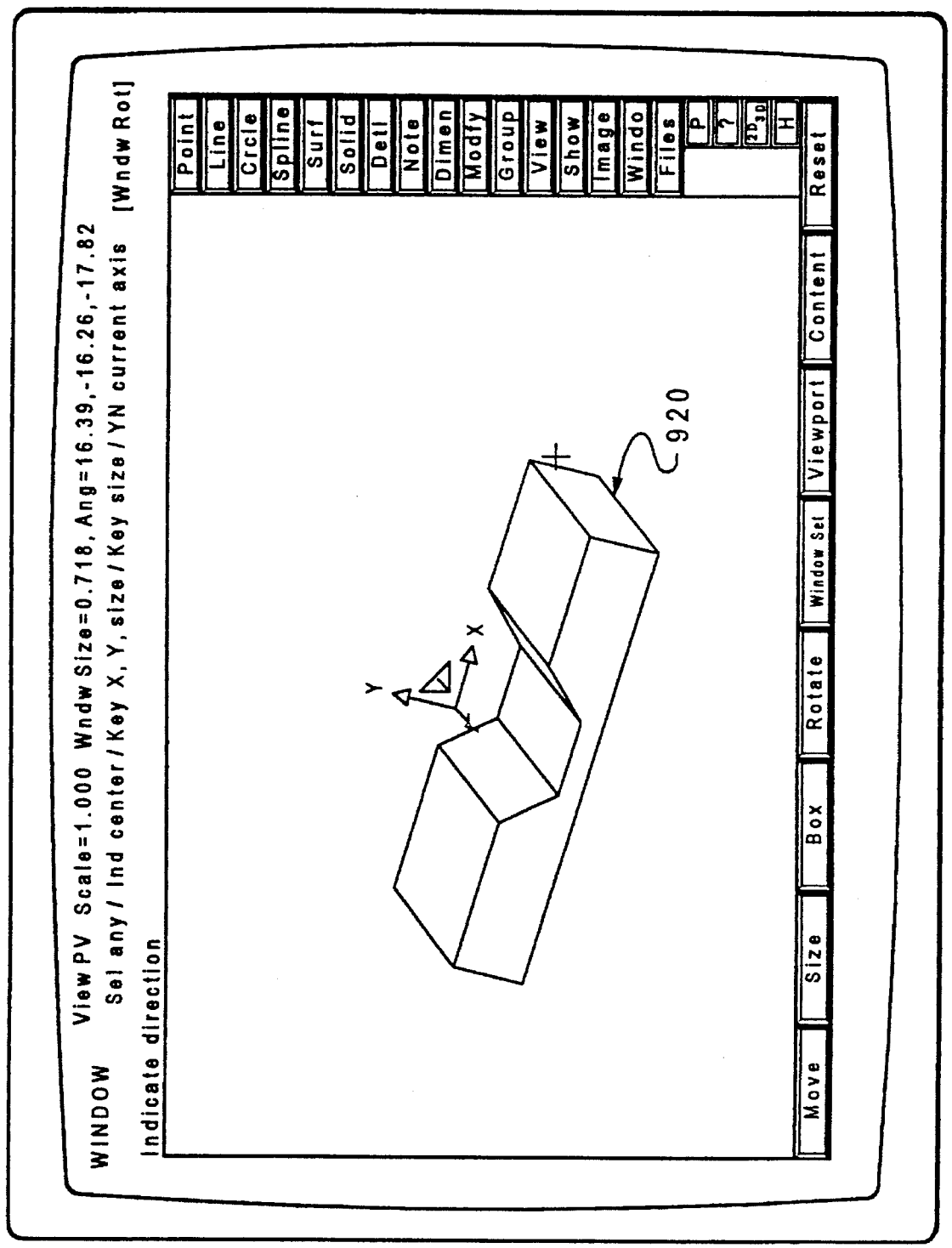
FIG. 10 is an illustration of a solid model in accordance with the present invention.

A further example involving a more complex geometry is presented in FIG. 9 and 10. In FIG. 9, a pair of two dimensional views of an object are presented at 900 and 910 respectively. A solid representation of the object is generated by selecting the front face and the back face. The generated solid is shown in FIG. 10.

Parametric Entities

In FIG. 11, the solid function parametric modification menu options are listed and their functions are elaborated upon. At label 1000, the menu options are displayed as they appear on a CAD display. If a user selects Def parent at label 1100, then the user is prompted to point to a plane of a solid that will function as the parent plane. The plane must be paired with a parallel offset plane whose distance is a variable that the user would like to change.

Label 1120 lists the Define Offset menu option. This option allows a user to define a plane of the solid parallel to the parent plane as an offset plane. Label 1130 depicts the Change parameter menu option. This item is selected to display the distance value between pairs of parent and offset planes. Label 1140 depicts the Show All menu option. This option is selected to display all planes that are not currently displayed for the solid object. Label 1150 is the No Show option which temporarily suppresses the display of a selected plane of the current solid so that a hidden plane can be selected.

Figure 12A:
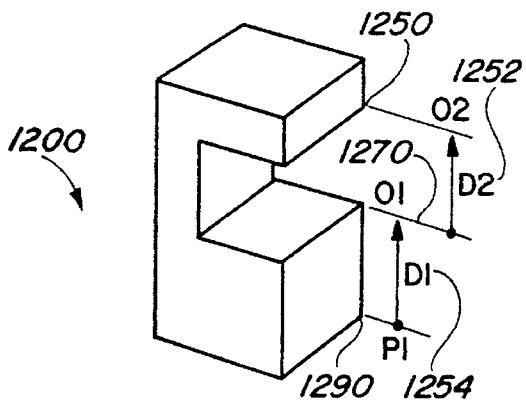
FIGS. 12A–12C are an illustration of correlating parametric entities in accordance with the present invention.
Figure 12B:
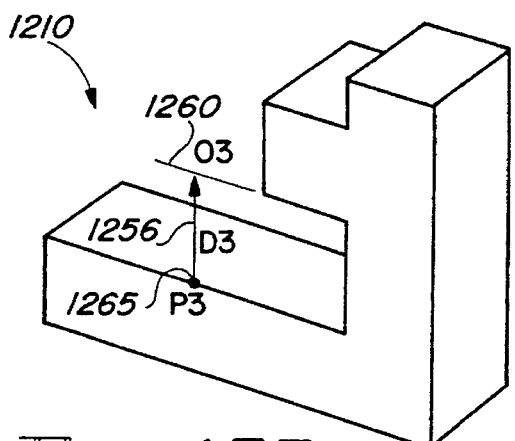
Figure 12C:
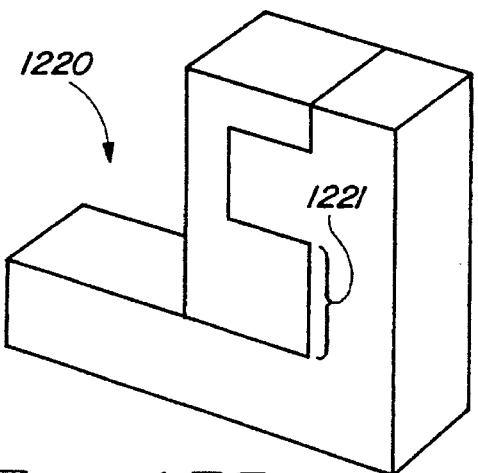
Figure 13:
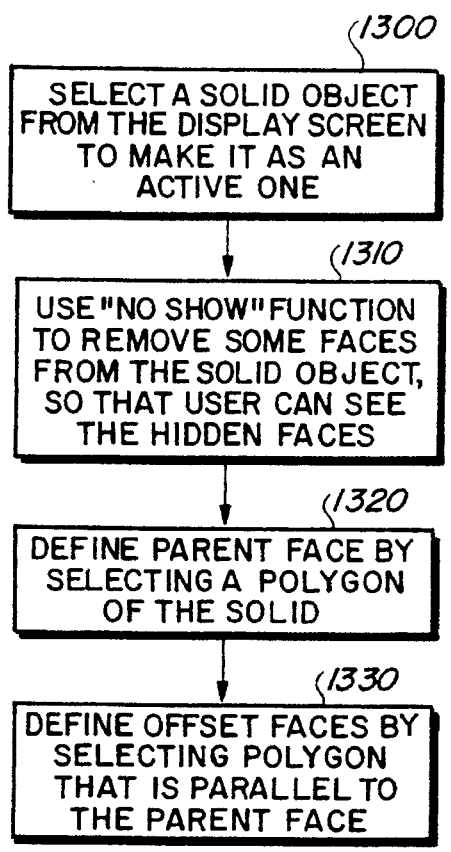
FIG. 13 is a flowchart describing the logic of defining relationships between the faces of a solid object in accordance with the subject invention.

To commence a parametric design a user selects a solid object from the display as described in function block 1300 of FIG. 13, and shown at label 1200 of FIG. 12. Optionally, the user can remove some faces from the solid object using the No Show function as shown in function block 1310 of FIG. 13. Then, the user defines a parent face by selecting a polygon of the solid as shown in function block 1320 and depicted at 1290 of FIG. 12. Offset faces parallel to the first face are selected next as shown in function block 1330 and depicted at 1270 and 1250 of FIG. 12. The distances between the offset faces 1252 and the distance between the parent face and the first offset face 1254 are calculated. The distance D1 1254 is a variable distance that will be adjusted. Whereas, the distance D2 1252 is a fixed distance that remains constant during this operation.

Figure 14:
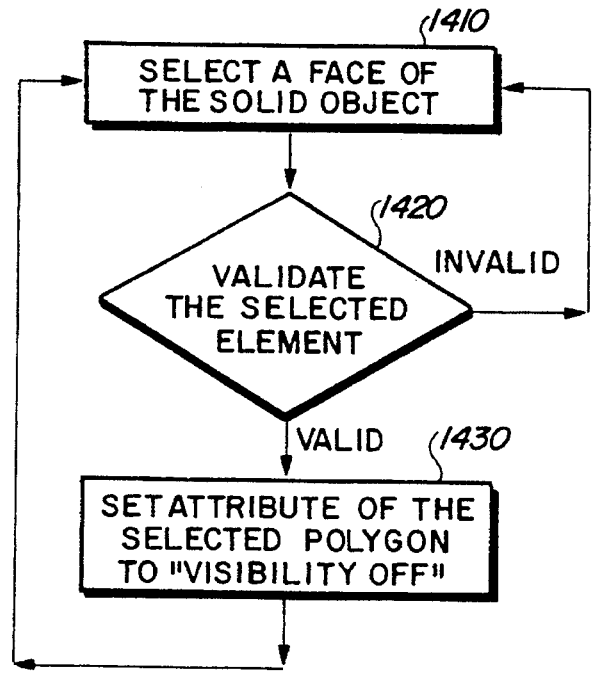
FIG. 14 is a flowchart describing the logic of the No Show function in accordance with the subject invention.

If the user selects the NoShow function then the logic set forth in FIG. 14 is employed to make the face invisible on the display. The user initially selects a polygon (face) of a solid and converts the pointer to a loop id as shown in function block 1410. Then, the face is validated by searching the PFace table for the Face that contains the loop. If the face is found, then the selected polygon is a valid face as depicted in decision block 1420. If not, then control flows to 1410. If the face is valid, then the system sets the attribute of the selected polygon to visibility off as shown in 1430.

The logic for defining a parent face is set forth in FIG. 15. As above, the user begins by selecting a polygon of the solid object as shown in function block 1510. Then, the system searches the PFace table to identify the Face that contains the loop as depicted in function block 1520. If the Face is identified in decision block 1530, then the Face ID as the Parent Face ID as shown in function block 1540. However, if the Face ID is not found, then the Parent Face ID is set to a null value as shown in function block 1550.

The logic for defining an offset face is set forth in FIG. 16. The user initially must select a polygon of the solid object as depicted in function block 1610. Then, the PFace table is searched for the Face ID of the selected polygon as depicted in function block 1620. A search is next made to determine the type of the Face and based on the type, control is passed to one of two function blocks 1650 or 1660. If the Face type is ordinary, then control is passed to function block 1660 where the distance between the Parent Face and the offset face is calculated and an entry to the parameter table is made to reflect the change. Finally, the Face Type is also changed to Offset Face. If the Face Type is already an Offset Face, then an invalid polygon has been selected as shown in function block 1640, and control is passed to an error routine. An Offset Face can be redefined as a parent face for another offset face to form a nested relation.

FIG. 17 presents the logic implementing the Change Parameter function. Function block 1700 indicates the first step is to select a polygon from the solid displayed on the graphic display. Then, the system searches through the PFace table for the face ID which the selected polygon is associated with as shown in function block 1710. Subsequently, the face ID is used to determine the face type as depicted in decision block 1720. If the face type is an ordinary face, then the polygon is highlighted on the display as depicted in function block 1730, the distance from the origin tot he face is displayed, and control passes to function block 1760. However, if the face type is an offset face, then the PFace table is searched for the identifier of the parent face and the associated polygon as shown in function block 1740. Then, the distance between the two offset faces is calculated, displayed and the polygons are highlighted as shown in function block 1750.

Function block 1760 depicts the next step, prompting the user to enter a new value for the distance via the keyboard. The new value is used to update the parameter table. If the polygon is a parent offset type, then modify the parameter of the selected face. If it is an ordinary face, then the parameter of the ordinary face is modified. Then, as illustrated in function block 1770, the PFace table is converted into a Face table. Finally, the solid is regenerated by sending the Face table and the construction list to the solid modeler to generate the modified solid as shown in function block 1780.

FIG. 12 shows a first solid 1200 and a second solid 1210 that are modified using the parametric entity function in accordance with the invention to create a finished assembly 1220. The distance D1 1254 in solid 1200 must be correlated with distance D3 1256 to complete the assembly correctly. Thus, the user initially selects D1 1254 as the variable distance from p1 1290 to 01 1270. The distance D2 is defined as a fixed distance, and the variable distance is equated to D3 1256. Thereafter, the system expands D1 1221 to comply with D3 1256 and completes the assembly.

Surface Normal Display

In a normal CAD system, a surface can be created regardless of the facing. However, a surface has two faces, one is facing in, and the other is facing out. Depending on the position or orientation of the surface in a composite object. Surface normal is a reference for indicating the facing of a surface. It is also a vector for calculating the shading value. Since the surface normal is not specified during the creation of the surface, the image of the shaded surface may not appear correct to the viewer.

Examples of surfaces displayed which employ the subject invention are presented in FIGS. 20, 21, 22 and 23. The logic for the processing is set forth in the flowcharts illustrated in FIGS. 18 and 19. FIG. 24 illustrates the variables behind the mathematics used to implement some of the invention's logic. Finally, the detailed source code and data structures used to implement the logic is presented and described in Appendix 7.

Referring to FIG. 18, function block 1800 shows the first step which displays the shaded surfaces without user specified shading. To shade the surface, the system generates polygons to approximate the surface. By shading each polygon according to the normals to the surface on each vertex of the polygon the shaded surface is indicated appropriately.

To shade a polygon, the system prepares a color table for shading and calculates the intensity of each vertex of the polygon. The algorithm for preparing the color table is shown in the "C" listing set forth below. The logic has two steps. Step one: linearly interpolate the color values of red, green and blue (RGB) separately. To generate the three tables, (RGB) with constant incrementation from the specified ambient light value to the full color of the object. For the current display device, the shading color is generated into two-hundred levels.

Step two: the algorithm uses a cosine function on top of the result of step one to extend the range of the shading colors. The final color table will range from the specified ambient light value to shiny, bright color that will give the shaded object a shining spot when the reflection of the light source on the surface is toward the viewer's eye.

To shade a polygon, the illumination value of each vertex must be calculated. Illumination (I) is calculated with the following equation.

$$I = Amb*Ka + Lv*Kd*(L \times N) + Ks*(R \times V)^m$$

Referring to FIG. 24, Amb is the ambient light value. Ka indicates how much of the ambient light is reflected from the object's surface. Lv is the intensity of the light source. L 2400 is the light vector. N 2410 is normal to the surface at the vertex. (L×N) 2440 is the cosine value of the angle between L vector and N vector. Kd indicates how much of the diffused light reflected from the surface. R 2420 is the reflection vector. V 2430 is the vector from the vertex to the eye. (R×V) 2460 is the cosine of the angle between vector R and vector V.

Since the illumination value is a sum of the ambient factor, diffuse factor and specular factor, the result may not fall within the acceptable range. Especially, when there are multiple light sources and the graphic hardware has a limited resolution. Thus, the following modification to the original equation is made to enhance shading.

$$I = Max(I[1], I[21], I[3], \ldots I[n]) \quad I[i] = A + (1-A)*D[i] + (1-A-(1-A)*D[i])*S[i];$$

where i=1,2 .. n for n light sources.

I[i] is the illumination value for the ith light source.

$A = amb*Ka; \quad D[i] = Lv[i]*(L[i] \times N);$ $S[i] = (R \times V)^m$

When the intensity of each vertex of a polygon is resolved, the intensity is converted to an index to the color table. (See data structure listing shown Appendix 8.)

Then, the user is prompted to select a particular surface to display as shown in function block 1810. The surface is selected by pointing with the cursor and using the pointer's coordinates to select the appropriate surface from the CADAM data base. Next, the selected surface is erased as shown in function block 1820. Then, the surface data is rearranged as set forth in function block 1830.

Four kinds of surface data can be rearranged, ruled surfaces, revolved surfaces, boundary surfaces, boundary surfaces and skin surfaces. The data structure of these surfaces is set forth in Appendix 9.

For ruled surfaces or revolved surfaces, the sequences of the control points are inverted and the knot sequences of its splines are calculated. For boundary surfaces, the sequences of the control points of spline one and two are inverted, and their knot sequences are recalculated. Splines three and four are swapped. For skin surfaces, each profile spline has its corresponding control points inverted and the knot sequences are recalculated. FIG. 19 sets forth the detailed logic presented in function blocks 1830 and 1840.

Finally, as shown in function block 1840, the selected surface is shaded based on the rearranged information.

Boundary Surfaces

As introduced, a boundary surface stores four splines which form a closed boundary of the surface. The surface normal processing logic is set forth in Appendix 10.

Figure 20:
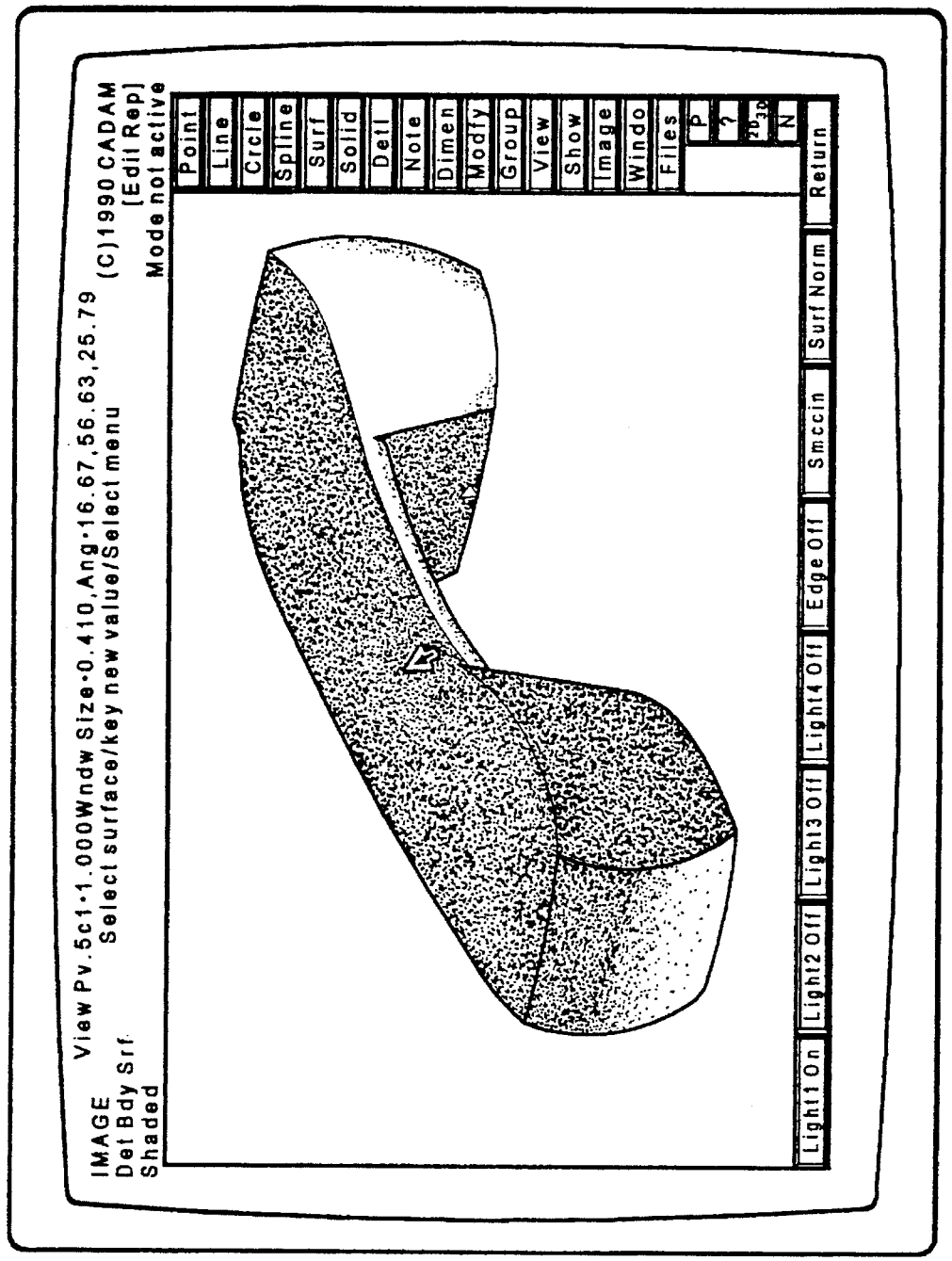
FIG. 20 is an illustration of a reverse normal of a top surface in accordance with the subject invention.
Figure 21:
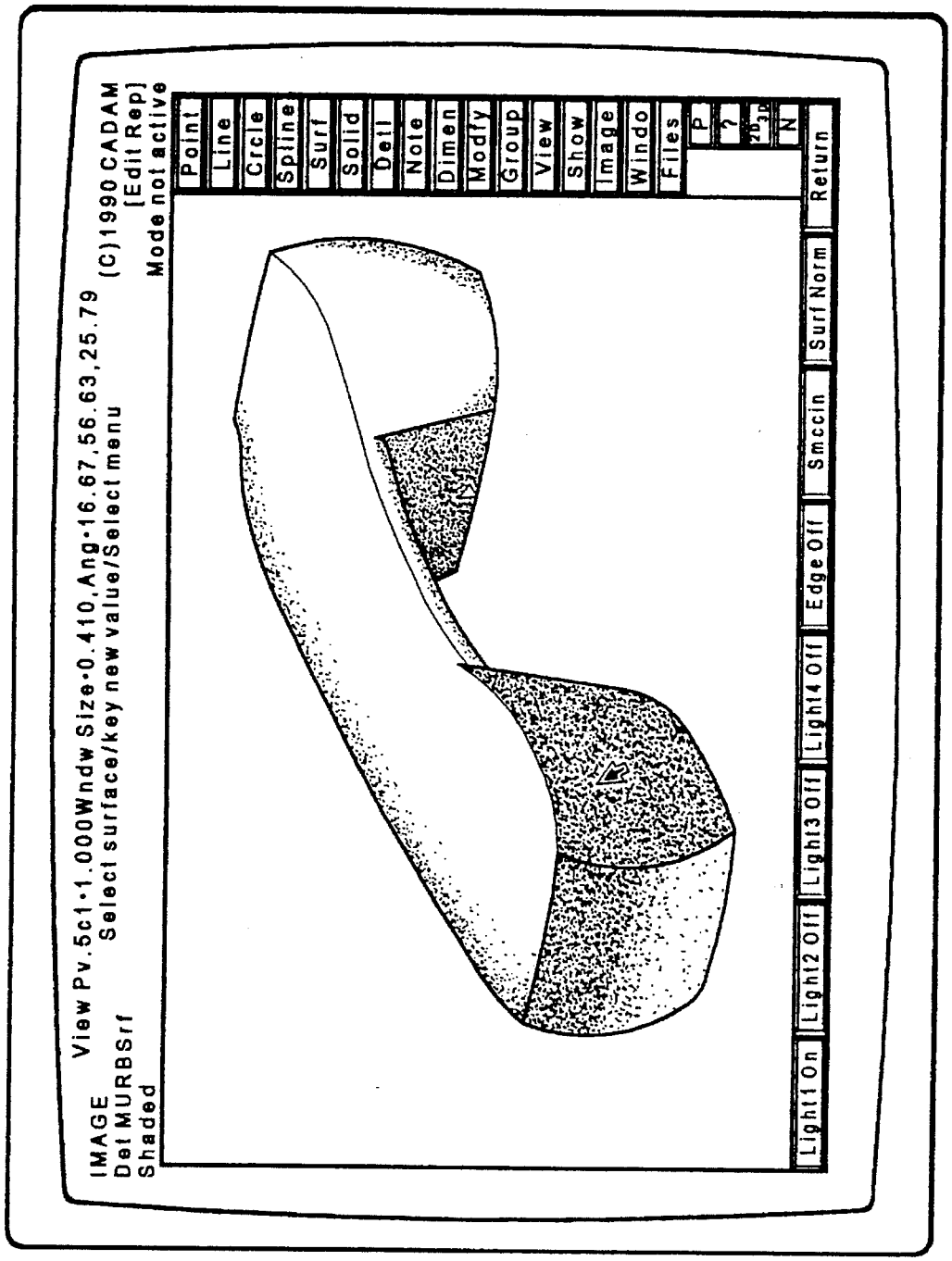
FIG. 21 is an illustration of a select side surface display in accordance with the subject invention.
Figure 22:
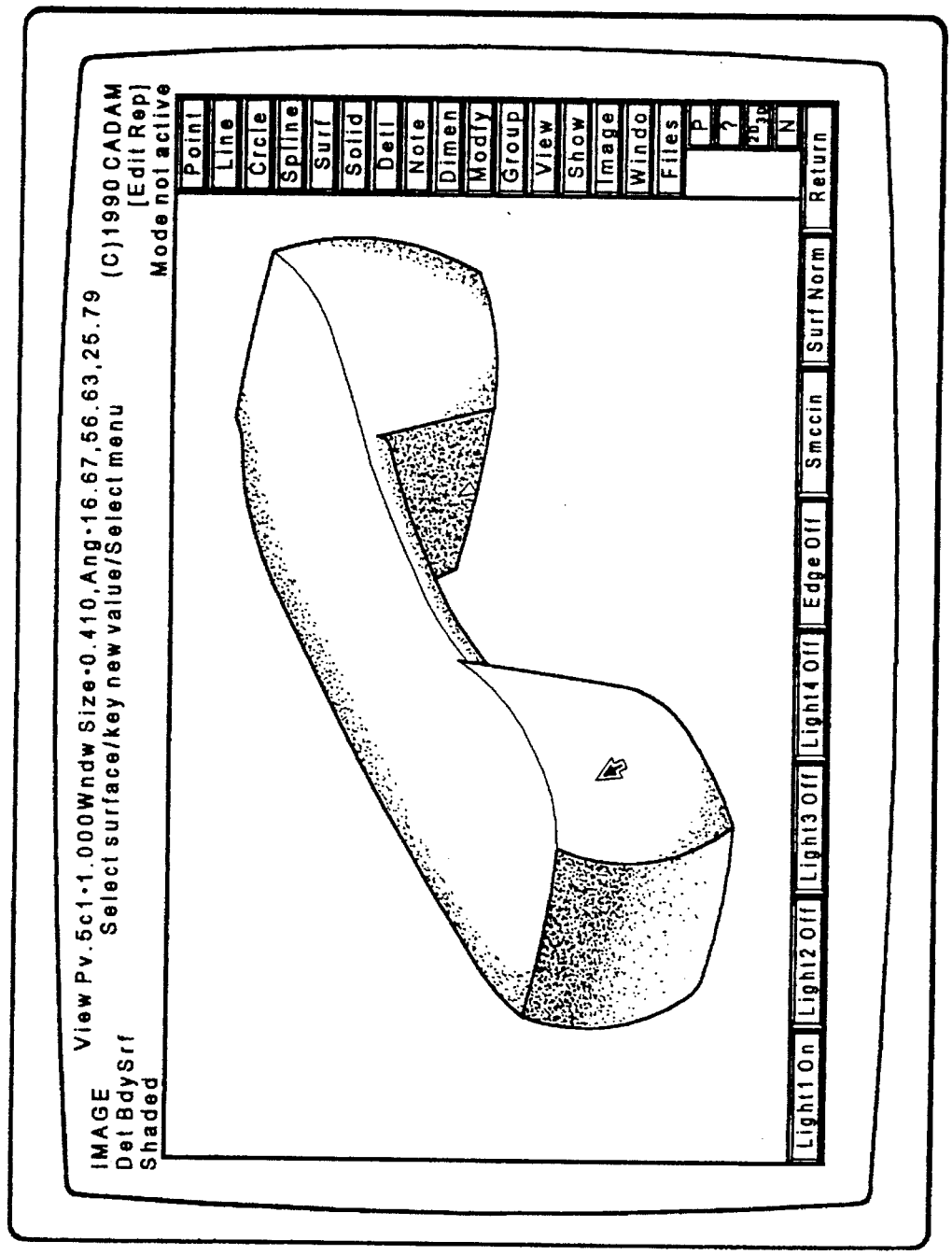
FIG. 22 is an illustration of a reverse normal of a side surface display in accordance with the subject invention.
Figure 23:
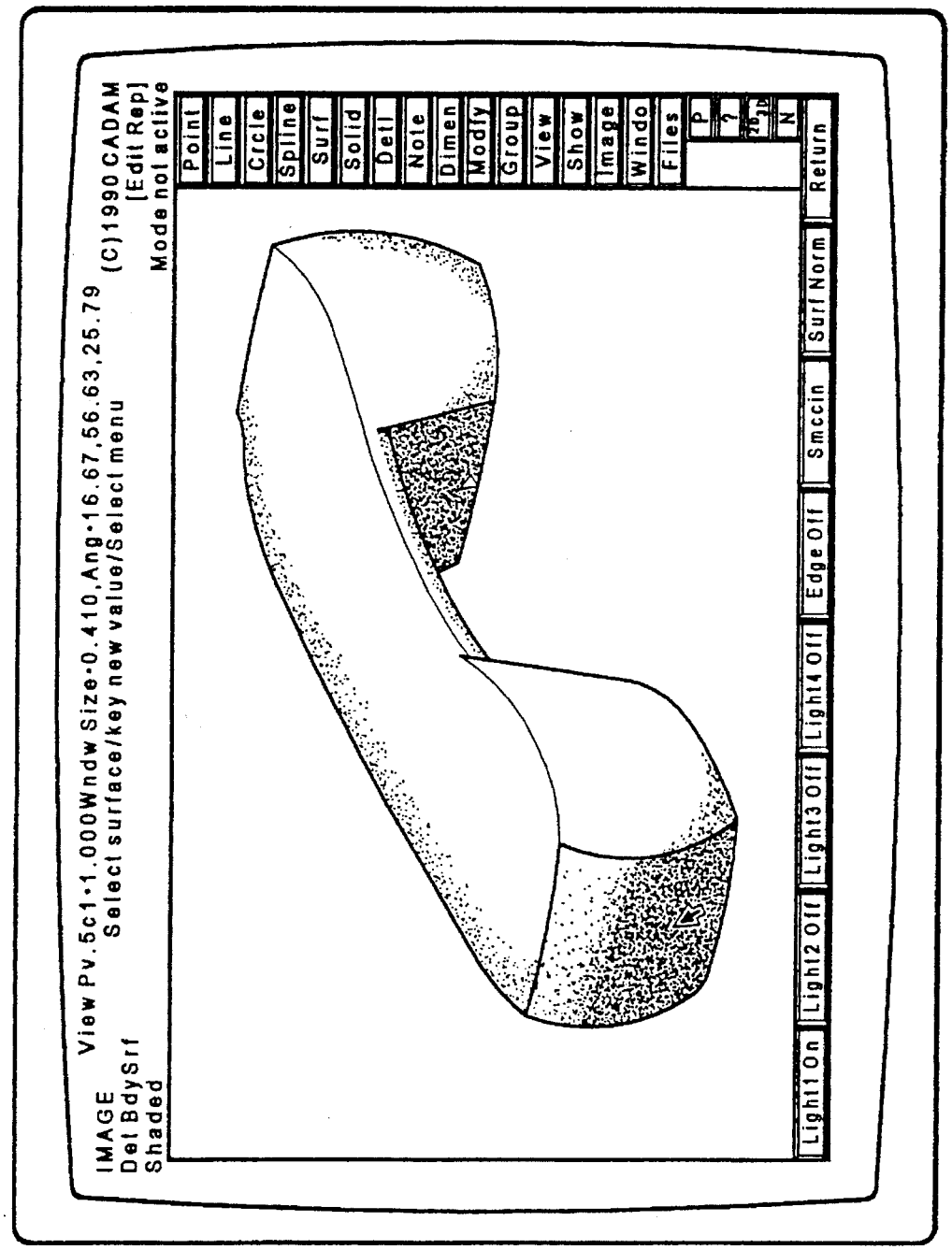
FIG. 23 is an illustration of a reverse normal of a front surface in accordance with the subject invention.

Four examples of shaded surfaces are presented in FIGS. 20, 21, 22 and 23. FIG. 20 shows a reverse surface normal of a top surface. FIG. 21 shows a surface normal of a side surface. FIG. 22 shows a reverse normal of a side surface, and FIG. 23 shows a reverse normal of a front surface.

While the invention has been described in terms of a preferred embodiment in a specific system environment, those skilled in the art recognize that the invention can be practiced, with modification, in other and different hardware and software environments within the spirit and scope of the appended claims.

APPENDIX 1:
```
/*
................................................................
:                                                              :
: PART V - The temporary records for keeping 2D elements       :
:                                                              :
: option:  1- extrusion                                        :
:          2- taper                                            :
:          3- pyramid                                          :
:          4- rotation                                         :
:                                                              :
: operation:                                                   :
:          1- add                                              :
:         -1- subtract                                         :
:                                                              :
: tip[2]      : a temporary cadam pointer to a point of a pyramid (not used)
: front, back : record front face and back face pointer (pointer to line)
: numbdry     : number of boundary segments in the bdry array
: bdry        : pointer to line and circle
: bdry1 bdry2 : only case 2 will use both index ( for taper only )
:               rest of the cases use bdry1                    :
:                                                              :
: IDENTIFICATION:                                              :
:                                                              :
: AUTHOR ......... ALLEN CHEN                                  :
: DATE   ......... 10/15/89                                    :
:                                                              :
................................................................
*/
struct  bdrytype
```

```
      {
short     numbdry;
short     bdry[maxbdry][2];
};

struct  frametype
      {
short     option;
short     operator;
short     front[2], back[2];
short     tip[2];
struct    bdrytype * bdry1;
struct    bdrytype * bdry2;
};

struct  film
      {
short     numframe;
struct    frametype * frame[maxframe];
};
```

APPENDIX 2:

```
/*
: PART I - CONSTANT DEFINITIONS FOR FACE TABLE
*/
#define FSIZE    200
#define MXSIZE   20
#define maxbdry  100
define maxframe 100 define VARSIZE  100

/*
: PART II - THE FACE TABLE & PARAMETRIC TABLE
*/

PFace

FaceType :
    1- PlaneFace
       subtype funcition
       ---------------------
         0    original plane face
         1    define offset plane, define :
              which defines the
              offset value or formula
         2    angled face
        11    define chamfer plane 2- Circular Cylinder
       subtype funcition
``` pointer to variable table

```
..  -----    ------------------------------------------------
..    0      original Cylinder, defines xy and R
..    1      define offset cylinder, define dR
..    2      define location
..    11     define round
..    12     define fillet ..    3-     ConicFace
..    4-     RuledFace
..    5-     FreeFormFace
..    x-  Arc   define cylinder number, A1, A2
..
: ...........................................................
: Fcode - mark the usage of the face
..
..   bit 1: solid faces
..       2: construction faces
..       3: symmetric faces (shall be defined by its children)
..       4: datum face (??? unknown yet)
..
..   note : bit map 15,14,13......3,2,1
..
: ...........................................................
: ModVar - count how many var were changed,
..        indicate the necessity of updating Var
..        table by bringing SmallTalk parser
..        not implemented in current version.
: ...........................................................
: struct PlaneSym
..
..  pair : stores the other symmetric face to the base
..  base : the base face
..
```

```
           .
           .
           .
           : struct PlaneChm
           .
           .   p1,p2,pw  -  pointer to plane faces
           :   v1,v2     -  pointer to variable table
           .
           .
           .
           : struct Parameter
           .
           .   mode - 1: value
           :          2: text
           .
           */
           #define ORGPLANE 0
           #define OFFPLANE 1
           #define SYMPLANE 2
           #define CHMPLANE 11 struct PlaneOrg
           {
              double  A, B, C, D;
           };

struct PlaneOff
           {
              short   base;
              short   varid;
           };

struct PlaneSym
           {
              short   base, pair;
              short   varid;
           };

struct PlaneChm
```

```
    {
    short    p1, p2, pw;
    short    v1, v2;
    };

union plane_ptr
    {
    struct   PlaneOrg   Porg;
    struct   PlaneSym   Psym;
    struct   PlaneOff   Poff;
    struct   PlaneChm   Pchm;
    };

struct PPlane
    {
    short       subtype;
    union       plane_ptr pclass;
    };

struct PCylinder
    {
    double   R, X, Y, A1, A2, Z1, Z2;
    short    MatrixIndex;
    short    Udisp;
    struct   POINT *Vertics[2][13];
    };

struct PCone
    {
    double   R1, R2, X, Y, A1, A2, Z1, Z2;
    short    MatrixIndex;
    short    Udisp;
    struct   POINT *Vertics[2][13];
    };

struct PRuled
    {
```

```
short    MatrixIndex;
short    Udisp;
struct   BSPLINE Bspl;
};

struct PFreeForm { int NU, NW; double *ControlPoints[50][50]; };

struct Parameter
{
    char    Label[8];
    double  value;
    char    text[72];
    short   mode;
};

union face_ptr
{
    struct PPlane     * PlaneFace;
    struct PCylinder  * CircularCylinder;
    struct PCone      * ConicFace;
    struct PRuled     * RuledFace;
    struct PFreeForm  * FreeFormFace;
};

struct PFace
{
    short    FaceType;
    short    Fcode;
    union    face_ptr fclass;
};

struct Matrix
{
    double   p1[3], p2[3], p3[3], p4[3];
};

struct PFaces
```

```
{
short     NumberFaces;
short     NumberMatrix;
short     NumberVar;
short     ModVar;
struct    PFace       *Face     [FSIZE];
struct    Matrix      *Matrix   [MXSIZE];
struct    Parameter   *Var      [VARSIZE];
};
```

APPENDIX 3:

```
/*
:............................................................
:
: PART III - THE FACE TABE FOR INTERFACING WITH SOLID MODULE
:
:............................................................
:
: define face table interface to solid
:
: define face tables
:
: MatrixIndex stores the index to matrix list
: SameFace    stores the index to the first equivalent face
:             shall be maintained every time a object was created
: Matrix      the array will start from 13 to 39.
:
: FaceTable
:
:    FaceType :   1- PlaneFace
:                 2- Circular Cylinder
:                 3- ConeFace
:                 4- RuledFace
:                 5- FreeFormFace
:
:............................................................
:
: IDENTIFICATION:
:
:    AUTHOR .......... FRANK NIU
:    DATE   .......... --/--/89
:
:............................................................
*/ struct  PlaneFace
{
```

```
        double    A, B, C, D;
        };

struct   CircularCylinder
        {
        double    R, X, Y, A1, A2, Z1, Z2;
        short     MatrixIndex;
        short     Udisp;
        struct    POINT *Vertics[2][13];
        };

struct   ConeFace
        {
        double    R1, R2, X, Y, A1, A2, Z1, Z2;
        short     MatrixIndex;
        short     Udisp;
        struct    POINT *Vertics[2][13];
        };

struct   RuledFace
        {
        short     MatrixIndex;
        short     Udisp;
        struct    BSPLINE Bspl;
        };

struct   FreeFormFace { int NU, NW; double *ControlPoints[50][50]; };

struct   FaceTable
        {
        short            FaceType;
        struct  PlaneFace           *PlaneFace;
        struct  CircularCylinder    *CircularCylinder;
        struct  ConeFace            *ConeFace;
        struct  RuledFace           *RuledFace;
        struct  FreeFormFace        *FreeFormFace;
        };
```

```
struct   Faces
{
  short   NumberFaces;
  short   NumberMatrix;
  struct  FaceTable  *FaceTable  [FSIZE];
  struct  Matrix     *Matrix     [MXSIZE];
};
```

APPENDIX 4:

```
/*
:..........................................................
: PART IV - The construction tree
:..........................................................
: component list
:
: . operator :        0 disabled component
:                     1 add component
:                    -1 substract component
:
: . component type :  1 extrusion
:                     2 taper
:                     3 pyramid
:                     4 rotataion
:..........................................................
: IDENTIFICATION:
:
: AUTHOR .......... ALLEN CHEN
: DATE ............ 10/15/89
:..........................................................
*/ struct   OneComponent
    {
    short    option;
    short    operator;
    short    numbdry;
    short    boundary[maxbdry];
    short    front, back;
    };
```

```
struct  Comphd
{
    short   NumberComponent;
    struct  OneComponent * component[maxframe];
};
```

APPENDIX 5:
/******************************************************************
 * Common Header files
 ******************************************************************
 */
include <math.h>
include <malloc.h>
include "3dgm1.f"
include "3dut1.f"
include "3dmi1.f"
include "units.h"
include "bspline.h"
include "param.h"
include "stb.h"

/******************************************************************
 * Header files for C_gm_telsld()
 ******************************************************************
 */
include "fkgp3d.h"

/******************************************************************
 * Header files for C_gm_trsld3x()
 ******************************************************************
 */
include "gt3d.h"

/******************************************************************
 * Definitions for C_gm_telsld()
 ******************************************************************
 */
define OrgPlane fclass.PlaneFace->pclass.Porg
define Cylinder fclass.CircularCylinder
define ConFace fclass.ConicFace /******************************************************************
 * Definitions for C_gm_trsld3x()

```
/****************************************************************
 */
define OrgPlane fclass.PlaneFace->pclass.Porg /****************************************************************
 * Function declearations for C_gm_tels1d()
 ****************************************************************
 */
static void  C_gm_1_remake_ABCD    ( short, double[],
                                     double, double, double, double,
                                     double*, double*, double*, double* );
static void  C_gm_1_remake_matrix  ( short, double[],
                                     double[][3], double[][3] );
static void  C_gm_2_point_on_plane ( double, double, double, double,
                                     double, double, double,
                                     double*, double*, double* );

static void  C_gm_2_rotate_point   ( double[], double[] );
static void  C_gm_2_mirror_point   ( double[], double[] );

/****************************************************************
 * Function declearations for C_gm_trs1d3x()
 ****************************************************************
 */
short C_trplnorm( short, double [], double[], double, double [], double *);
short C_trmxab  ( double[],double[],double[],double[],double[]);
short C_trmxlc  ( double[],double[],double[],double[]);

/****************************************************************
 * [Function Name]
 *     iret = C_gm_tels1d ( iopt, tdata, solid_ptr )
 *
 * [Category]
 *     Geometric Calculation ( Translation of element )
 *
 * [Description]
```

```
*       Transform SOLID
*
*   [Parameters]
*       (i) short    iopt       -- Processing Option
*                                   1 : Translation (Move)
*                                   2 : Mirroring
*                                   3 : Rotation
*                                   4 : Scaling
*
*       (i) double   tdata[]    -- Data for Translation
*                                   iopt=1 => tdata[3]:  DX,DY,DZ
*                                   iopt=2 => tdata[12]: Data of Mirror Plane
*                                   iopt=3 => tdata[7]:  X,Y,Z (Point on Axis)
*                                                        A,B,C (Vextor of Axis)
*                                                        ANG   (Rotation Angle)
*                                   iopt=4 => tdata[4]:  X,Y,Z (Center of Scale)
*                                                        SCL   (Scaling Factor)
*
*       (i) short    solid_ptr[2] -- Pointer of Solid (In)
*
*       (o) short    iret       -- Return Code (0:OK, 1:Error)
*
*   [External Variables]
*       struct PFaces   PFaces
*       struct Comphd   CompList
*
*   [Calls]
*       Retv_Solid                  ( defparam.c )
*       Q_subtype                   (     "      )
*       Q_Plane_ABCD                (     "      )
*       Save_Parameters             (     "      )
*       Save_Solid                  (     "      )
*       del_solid_polygons          ( entersd.c  )
*
*   [Restriction]
*
*   [Algorithm]
```

```
/***********************************************************************
 *
 *    1. Get face table from elmptr
 *    2. Transform face table
 *    3. Transform working plane
 *    4. Validate the transformed solid
 *    5. Save the transfomed solid
 *
 ***********************************************************************
 *
 *    Created by    .....  Eiji Nakano
 *    Date          .....  2/23/90
 *
 ***********************************************************************
 *
 *    Modified by   .....  Allen Chen
 *    Date          .....  6/25/90
 *    Nature(#1)    .....  Change stb.h and param.h
 *
 *    Modified by   .....  Allen Chen
 *    Date          .....  10/3/90
 *    Nature(#2)    .....  use local variables (PFaces, Solid, Complist)
 *                         copy solid is a special case, done by cpysld() in
 *                         solidmi.c.
 *                         Fix error in scaling face table and working plane.
 *
 ***********************************************************************/ short C_gm_telsld( iopt, tdata, solid_ptr )
short    iopt;
short    solid_ptr[];
double   tdata[];
{
    char   sname[128];
    char   lbl[8],str[72];
    short  fid,stype;
    short  ftype;
```

```
short    iret;
short    i;
short    ihdata[10];
short    pid,mode;
double   value;
double   A,B,C,D;
double   AA,BB,CC,DD;
double   new_matrix[4][3], old_matrix[4][3];

struct PFaces *PFaces;
struct Comphd *CompList;
struct SolidTable *Solid;

PFaces = (struct PFaces *) malloc (sizeof (struct PFaces));
if (PFaces == 0) return 200;
CompList = (struct Comphd *) malloc (sizeof(struct Comphd));
if (CompList == 0)
    {
    free(PFaces);
    return 200;
    }
Solid = (struct SolidTable *) malloc (sizeof(struct SolidTable));
if (Solid == 0)
    {
    free(PFaces);
    free(CompList);
    return 200;
    } ihdata[0] = 0;

Retv_Solid( solid_ptr, PFaces, CompList, sname );

for( fid=1; fid<=PFaces->NumberFaces; fid++ )
{
    ftype = PFaces->Face[fid]->FaceType;
/*********/
```

```c
/* plane */
/**********/
if( ftype == 1 )
{
    /*............................................
     : Allen Chen 10/9/90
     : offset faces shall be scaled with scaling value
     ............................................
    */.
    Q_subtype( PFaces, fid, &stype );
    if ( stype != 0 )
    {
        if (iopt == 4)
        {
            iret = Q_OffFace(PFaces,fid,&pid,lbl,&value,str,&mode);
            if (iret == 0)
            {
                value *= tdata[3];
                iret = Mod_OffFace((short)1,PFaces,pid,fid,value,str);
            }
        }
    }
    else
    {
        Q_Plane_ABCD( PFaces, fid, &A, &B, &C, &D );

C_gm_1_remake_ABCD( iopt, tdata, A, B, C, D, &AA, &BB, &CC, &DD );

PFaces->Face[fid]->OrgPlane.A = AA;
        PFaces->Face[fid]->OrgPlane.B = BB;
        PFaces->Face[fid]->OrgPlane.C = CC;
        PFaces->Face[fid]->OrgPlane.D = DD;
    }
}

/****************************************/
/* cylinder or conic and scaling */
/****************************************/
```

```
    else if( (ftype == 2 || ftype == 3) && iopt == 4 )
    {
    /**************/
    /* cylinder */
    /**************/
      if( ftype == 2 )
      {
        PFaces->Face[fid]->Cylinder->R *= tdata[3];
        PFaces->Face[fid]->Cylinder->X *= tdata[3];
        PFaces->Face[fid]->Cylinder->Y *= tdata[3];
      }
    /**************/
    /* conic */
    /**************/
      else if( ftype == 3 )
      {  PFaces->Face[fid]->ConFace->R1 *= tdata[3];
         PFaces->Face[fid]->ConFace->R2 *= tdata[3];
         PFaces->Face[fid]->ConFace->X  *= tdata[3];
         PFaces->Face[fid]->ConFace->Y  *= tdata[3];
      }
    } for( i=1; i<=PFaces->NumberMatrix; i++ )
    {
      C_ut_dpsto( 3, PFaces->Matrix[i]->p1, old_matrix[0] );
      C_ut_dpsto( 3, PFaces->Matrix[i]->p2, old_matrix[1] );
      C_ut_dpsto( 3, PFaces->Matrix[i]->p3, old_matrix[2] );
      C_ut_dpsto( 3, PFaces->Matrix[i]->p4, old_matrix[3] );
      c_gm_1_remake_matrix( iopt, tdata, old_matrix, new_matrix );
      C_ut_dpsto( 3, new_matrix[0], PFaces->Matrix[i]->p1 );
      C_ut_dpsto( 3, new_matrix[1], PFaces->Matrix[i]->p2 );
      C_ut_dpsto( 3, new_matrix[2], PFaces->Matrix[i]->p3 );
      C_ut_dpsto( 3, new_matrix[3], PFaces->Matrix[i]->p4 );
    }
}
/*..............................................................
  : Allen Chen 10/2/90
```

```
: option 1 is replacing the model block with the new data.
: See "solidmi.c" for details.
:.................................................................
*/
iret = mksolid (PFaces, CompList, Solid);
if (iret == 0)
    iret = C_mi_sdstore ((short)1, PFaces, CompList, sname, ihdata, solid_ptr );

C_sd_cpftable(PFaces);
C_sd_ccompl(CompList);
FreeSolid (Solid);
free (Solid);
free (CompList);
free (PFaces);
if (iret != 0) iret = 1;
return( iret );
}

/*................................................................
: static void C_gm_1_remake_ABCD( iopt, tdata, A. B, C, D, AA, BB, CC, DD )
:.................................................................
: make new plane data from old plane data
:..
:..
:..
: input   short    iopt    ---   1   move
:..                              2   mirror
:..                              3   rotate
:..                              4   scale
:..         double   tdata[]  --  Data for Translation
:..                                 iopt=1 => tdata[3]: DX,DY,DZ
:..                                 iopt=2 => tdata[12]: Data of Mirror Plane
:..                                 iopt=3 => tdata[7]: X,Y,Z  (Point on Axis)
:..                                                     A,B,C  (Vextor of Axis)
:..                                                     ANG    (Rotation Angle)
:..                                 iopt=4 => tdata[4]: X,Y,Z  (Center of Scale)
:..                                                     SCL    (Scaling Factor)
:..
:..         double   A,B,C,D   -  old plane data
```

```
/*
: output double *AA,*BB,*CC,*DD - new plane data
:...........................................................
: Allen Chen 10/8/90
: make the vector [AA,BB,CC] as unit vector
:...........................................................
*/
static void C_gm_1_remake_ABCD( iopt, tdata, A, B, C, D, AA, BB, CC, DD )
short   iopt;
double  tdata[];
double  A,B,C,D;
double  *AA,*BB,*CC,*DD;
{
        double pt1[3],pt2[3],dist[3];
        double d;

/**********/
/* move */
/**********/
        if( iopt == 1 )
        {       *AA = A;
                *BB = B;
                *CC = C;
                *DD = A*tdata[0] + B*tdata[1] + C*tdata[2] + D;
        }
/**********/
/* mirror */
/**********/
        else if( iopt == 2 )
        {       C_gm_2_point_on_plane( A, B, C, D, 0.0, 0.0, 0.0,
                                        &pt1[0], &pt1[1], &pt1[2] );
                pt2[0] = pt1[0] + A;
                pt2[1] = pt1[1] + B;
                pt2[2] = pt1[2] + C;
                C_gm_2_mirror_point( pt1, tdata, pt1 );
                C_gm_2_mirror_point( pt2, tdata, pt2 );

*AA = pt2[0] - pt1[0];
```

```
            *BB = pt2[1] - pt1[1];
            *CC = pt2[2] - pt1[2];
            d = sqrt((*AA)*(*AA) + (*BB)*(*BB) + (*CC)*(*CC));
            *AA /= d;
            *BB /= d;
            *CC /= d;
            *DD = *AA*pt1[0] + *BB*pt1[1] + *CC*pt1[2];
        }
/***********/
/* rotate  */
/***********/
        else if( iopt == 3 )
        {   C_gm_2_point_on_plane( A, B, C, D, 0.0, 0.0, 0.0,
                                   &pt1[0], &pt1[1], &pt1[2] );

pt2[0] = pt1[0] + A;
            pt2[1] = pt1[1] + B;
            pt2[2] = pt1[2] + C;
            C_gm_2_rotate_point( pt1, tdata, pt1 );
            C_gm_2_rotate_point( pt2, tdata, pt2 );

*AA = pt2[0] - pt1[0];
            *BB = pt2[1] - pt1[1];
            *CC = pt2[2] - pt1[2];
            d = sqrt((*AA)*(*AA) + (*BB)*(*BB) + (*CC)*(*CC));
            *AA /= d;
            *BB /= d;
            *CC /= d;
            *DD = *AA*pt1[0] + *BB*pt1[1] + *CC*pt1[2];
        }
/***********/
/* scale   */
/***********/
        else if( iopt == 4 )
        {   C_gm_2_point_on_plane( A, B, C, D, tdata[0], tdata[1], tdata[2],
                                   &pt1[0], &pt1[1], &pt1[2] );

C_ut_dpsub( 3, pt1, tdata, dist );
            C_ut_dpmult( 3, tdata[3], dist, dist );
```

```
    C_ut_dpadd( 3, tdata, dist, pt1 );

*AA = A / tdata[3];
    *BB = B / tdata[3];
    *CC = C / tdata[3];
    d = sqrt((*AA)*(*AA) + (*BB)*(*BB) + (*CC)*(*CC));
    *AA /= d;
    *BB /= d;
    *CC /= d;
    *DD = *AA*pt1[0] + *BB*pt1[1] + *CC*pt1[2];
}
/*..............................................................
: static void C_gm_1_remake_matrix( iopt, tdata, old_matrix, new_matrix )
:..............................................................
: make new matrix data from old matrix
:
: input    short   iopt      --   1   move
:                                 2   mirror
:                                 3   rotate
:                                 4   scale
:          double  tdata[]   --   Data for Translation
:                                     iopt=1 => tdata[3]:  DX,DY,DZ
:                                     iopt=2 => tdata[12]: Data of Mirror Plane
:                                     iopt=3 => tdata[7]:  X,Y,Z  (Point on Axis)
:                                                          A,B,C  (Vextor of Axis)
:                                                          ANG    (Rotation Angle)
:                                     iopt=4 => tdata[4]:  X,Y,Z  (Center of Scale)
:                                                          SCL    (Scaling Factor)
:          double  old_matrix[4][3]  -- present matrix
: output   double  new_matrix[4][3]  -- regenerated matrix
*/
static void C_gm_1_remake_matrix( iopt, tdata, old_matrix, new_matrix )
short   iopt;
double  tdata[];
double  old_matrix[][3];
```

```
double new_matrix[] [3];
{
    short   i;
    double  pt1[3],pt2[3];
    double  dist[3];

/*********/
/* move */
/*********/
    if( iopt == 1 )
    {
        C_ut_dpadd( 3, old_matrix[3], tdata, new_matrix[3] );
        C_ut_dpsto( 3, old_matrix[0], new_matrix[0] );
        C_ut_dpsto( 3, old_matrix[1], new_matrix[1] );
        C_ut_dpsto( 3, old_matrix[2], new_matrix[2] );
    }

/************/
/* mirror */
/************/
    else if( iopt == 2 )
    {   pt1[0] = pt1[1] = pt1[2] = 0.0;
        C_gm_2_mirror_point( pt1, tdata, pt1 );

for( i=0; i<3; i++ )
        {   C_gm_2_mirror_point( old_matrix[i], tdata, pt2 );
            C_ut_dpsub( 3, pt2, pt1, new_matrix[i] );
        }
        C_gm_2_mirror_point( old_matrix[3], tdata, new_matrix[3] );
    }

/************/
/* rotate */
/************/
    else if( iopt == 3 )
    {   pt1[0] = pt1[1] = pt1[2] = 0.0;
        C_gm_2_rotate_point( pt1, tdata, pt1 );
```

```
       for( i=0; i<3; i++ )
       { C_gm_2_rotate_point( old_matrix[i], tdata, pt2 );
         C_ut_dpsub( 3, pt2, pt1, new_matrix[i] );
       }

C_gm_2_rotate_point( old_matrix[3], tdata, new_matrix[3] );
    }
/*********/
/* scale */
/*********/
    else if( iopt == 4 )
    {
       C_ut_dpsub ( 3, old_matrix[3], tdata, dist );
       C_ut_dpmult( 3, tdata[3], dist, dist );
       C_ut_dpadd ( 3, tdata, dist, new_matrix[3] );

C_ut_dpsto( 3, old_matrix[0], new_matrix[0] );
       C_ut_dpsto( 3, old_matrix[1], new_matrix[1] );
       C_ut_dpsto( 3, old_matrix[2], new_matrix[2] );
    }
}

/*...................................................................
: static void C_gm_2_point_on_plane(A,B,C,D, px,py,pz, x,y,z)
:..................................................................
: by Allen Chen (2/28/90)
:..
: find intersecting point of the plane(Ax+By+Cz=D)
: and the 3D line (vector(A,B,C) & point(px,py,pz) ).
:..
: Note: the vector of the 3D line has to be the same as
:       the normal vector of the plane.
:..................................................................
: input   double  A,B,C,D      plane data
:         double  px,py,pz     3D point
:..
```

```
; output  double   *x,*y,*z    intersecting point
*/
static void C_gm_2_point_on_plane(A,B,C,D, px,py,pz, x,y,z)
double A,B,C,D;
double px,py,pz;
double *x,*y,*z;
{
    double tvalue;

tvalue = ( D - ( A*px + B*py + C*pz ) ) / ( A*A + B*B + C*C );
    *x = px + tvalue * A;
    *y = py + tvalue * B;
    *z = pz + tvalue * C;
}
/*.................................................................
: static void C_gm_2_rotate_point( pt1, tdata, pt2 )
:
: find the point after rotation
:
:   input   double    pt1[3]      -- 3D point
:           double    tdata[7]    -- rotating data: X,Y,Z  (Point on Axis)
:                                                   A,B,C  (Vextor of Axis)
:                                                   ANG    (Rotation Angle)
:   output  double    pt2[3]      -- rotated point
*/
static void C_gm_2_rotate_point( pt1, tdata, pt2 )
double pt1[];
double tdata[];
double pt2[];
{
    double ptw[3],ptw2[3];
    double matrix[4][3];

C_gm_ptxln3( pt1, tdata, ptw );
    if( C_ut_dpdist( 3, pt1, ptw ) < UNITS.toler )
    {   C_ut_dpsto( 3, pt1, pt2 );
        return;
```

```
        }
        C_ut_dpadd( 3, tdata, &tdata[3], ptw );
        C_gm_crtpln( tdata, ptw, pt1, matrix[0] );

C_gm_tran3d( 2, matrix[0], ptw, pt1 );

ptw2[0] = ptw[0];
        ptw2[1] = ptw[1] * cos( tdata[6] );
        ptw2[2] = ptw[1] * sin( tdata[6] );

C_gm_tran3d( 1, matrix[0], ptw2, pt2 );
}
/*...........................................................................
 : static C_gm_2_mirror_point( pt1, tdata, pt2 )
 :...........................................................................
 : find the mirroring point
 :
 : input    double    pt1[3]      -- 3D point
 :          double    tdata[12]   -- plane data
 : output   double    pt2[3]      -- mirroring point
 */
static void C_gm_2_mirror_point( pt1, tdata, pt2 )
double pt1[];
double tdata[];
double pt2[];
{
        double ptw[3],dist[3];

C_gm_ptxpl3( pt1, tdata, ptw );
        C_ut_dpsub( 3, ptw, pt1, dist );
        C_ut_dpadd( 3, ptw, dist, pt2 );
}

/****************************************************************************
 * [Function Name]
```

```
*       iret = C_gm_trsld3x( iopt, mtrx, ptr )
*
*   [Category]
*       Geomatry Calculation
*
*   [Description]
*       Convert 3D Ruled Surface
*
*   [Parameters]
*       (i)  short    iopt      -- Processing Option
*                                    1: Local(mtrx)  ==> Absolute
*                                    2: Absolute     ==> Local(mtrx)
*
*       (i)  double   mtrx[4][3]  - matrix of coordinate convention
*
*      (i/o) short    ptr[2]    --- pointer to Solid model block
*
*       (o)  short    iret      -- Return code (0:OK,1:NG)
*
*   [External Variables]
*
*   [Calls]
*
*   [Restriction]
*
*   [Algorithm]
*
************************************************************
*       Created by    .....   Allen Chen
*       Date          .....   10/23/90
************************************************************
*       Modified by   .....
*       Date          .....
```

```
/*************************************************************
 *     Nature(#1) ....
 *
 *************************************************************/
short C_gm_trsld3x( iopt, mtrx, ptr )
short iopt,ptr[];
double mtrx[];
{
    char   sname[128];
    short  fid,stype;
    short  ftype;
    short  iret;
    short  i;
    short  ihdata[10];
    double D;
    double DD;
    double pn[3], pnn[3];

struct PFaces *PFaces;
    struct Comphd *CompList;
    struct SolidTable *Solid;

PFaces = (struct PFaces *) malloc (sizeof (struct PFaces));
    if (PFaces == 0) return 200;
    CompList = (struct Comphd *) malloc (sizeof(struct Comphd));
    if (CompList == 0)
    {
        free(PFaces);
        return 200;
    }
    Solid = (struct SolidTable *) malloc (sizeof(struct SolidTable));
    if (Solid == 0)
    {
        free(PFaces);
        free(CompList);
        return 200;
```

```
Retv_Solid( ptr, PFaces, CompList, sname );
for( fid=1; fid<=PFaces->NumberFaces; fid++ )
{
    ftype = PFaces->Face[fid]->FaceType;
    if( ftype == 1 )
    {
    /*...........................................................
     : Allen Chen 10/9/90
     : offset faces shall be scaled with scaling value
     ...........................................................*/
     Q_subtype( PFaces, fid, &stype );
     if ( stype == 0 )
     {
         Q_Plane_ABCD( PFaces, fid, &pn[0], &pn[1], &pn[2], &D );

iret = C_trplnorm( iopt, mtrx, pn, D, pnn, &DD );

PFaces->Face[fid]->OrgPlane.A = pnn[0];
         PFaces->Face[fid]->OrgPlane.B = pnn[1];
         PFaces->Face[fid]->OrgPlane.C = pnn[2];
         PFaces->Face[fid]->OrgPlane.D = DD;
     }
}
if (iopt == 1 )
    for( i=1; i<=PFaces->NumberMatrix; i++ )
    {
        iret = C_trmxab ( mtrx, PFaces->Matrix[i]->p1,
                          PFaces->Matrix[i]->p2, PFaces->Matrix[i]->p3,
                          PFaces->Matrix[i]->p4);
    }
else if (iopt == 2)
    for( i=1; i<=PFaces->NumberMatrix; i++ )
    {
```

```
        iret = C_trmxlc ( mtrx, PFaces->Matrix[i]->p1,
                                PFaces->Matrix[i]->p2, PFaces->Matrix[i]->p3,
                                PFaces->Matrix[i]->p4);
    } iret = mksolid (PFaces, CompList, Solid);
    if (iret == 0)
        iret = C_mi_sdstore ((short)1, PFaces, CompList, sname, ihdata, ptr );

C_sd_cpftable(PFaces);
    C_sd_ccompl(CompList);
    FreeSolid (Solid);
    free (Solid);
    free (PFaces);
    free (CompList);
    if (iret != 0) iret = 1;
    return( iret );
} short C_trplnorm( iopt, mtrx, n, D, nn, DD)
short iopt;
double mtrx[];
double n[], D;
double nn[], *DD;
{
    double t;
    double p[3], q[3];

p[0] = D * n[0];
    p[1] = D * n[1];
    p[2] = D * n[2];

if (iopt == 1)
    {
        C_gm_tran3d( 11, mtrx, n, nn);
        C_gm_tran3d(  1, mtrx, p, q);
    }
```

```
        else if (iopt == 2)
            {
            C_gm_tran3d( 12, mtrx, nn, n);
            C_gm_tran3d(  2, mtrx, q, p);
            } t = sqrt(nn[0]*nn[0] + nn[1]*nn[1] + nn[2]*nn[2]);
    if (t < 1.e-6) return 1;
    else if (fabs(t-1.0) > 1.e-6)
        {
        nn[0] /= t;
        nn[1] /= t;
        nn[2] /= t;
        }

*DD = nn[0]*q[0] + nn[1]*q[1] + nn[2]*q[2];

return 0;
} short C_trmxab ( mtrx, p1, p2, p3, p4)
double mtrx[];
double p1[],p2[],p3[],p4[];
{
    double v[3], o[3], tv[3],len;

C_gm_tran3d( 1, mtrx, p4, o);

v[0] = p1[0] + p4[0];
    v[1] = p1[1] + p4[1];
    v[2] = p1[2] + p4[2];
    C_gm_tran3d( 1, mtrx, v, tv);
    tv[0] -= o[0];
    tv[1] -= o[1];
    tv[2] -= o[2];
    len = sqrt(tv[0]*tv[0] + tv[1]*tv[1] + tv[2]*tv[2]);
    p1[0] = tv[0]/len;
```

```
    p1[1] = tv[1]/len;
    p1[2] = tv[2]/len;
    v[0] = p2[0] + p4[0];
    v[1] = p2[1] + p4[1];
    v[2] = p2[2] + p4[2];
    C_gm_tran3d( 1, mtrx, v, tv);
    tv[0] -= o[0];
    tv[1] -= o[1];
    tv[2] -= o[2];
    len = sqrt(tv[0]*tv[0] + tv[1]*tv[1] + tv[2]*tv[2]);
    p2[0] = tv[0]/len;
    p2[1] = tv[1]/len;
    p2[2] = tv[2]/len;

v[0] = p3[0] + p4[0];
    v[1] = p3[1] + p4[1];
    v[2] = p3[2] + p4[2];
    C_gm_tran3d( 1, mtrx, v, tv);
    tv[0] -= o[0];
    tv[1] -= o[1];
    tv[2] -= o[2];
    len = sqrt(tv[0]*tv[0] + tv[1]*tv[1] + tv[2]*tv[2]);
    p3[0] = tv[0]/len;
    p3[1] = tv[1]/len;
    p3[2] = tv[2]/len;

C_ut_dpsto ( 3, o, p4);
    return 0;
} short C_trmxlc ( mtrx, p1, p2, p3, p4)
double mtrx[];
double p1[],p2[],p3[],p4[];
{
    double v[3], tv[3], o[3],len;
```

```
C_gm_tran3d( 2, mtrx, o, p4);

v[0] = p1[0] + p4[0];
v[1] = p1[1] + p4[1];
v[2] = p1[2] + p4[2];
C_gm_tran3d( 2, mtrx, tv, v);
tv[0] -= o[0];
tv[1] -= o[1];
tv[2] -= o[2];
len = sqrt(tv[0]*tv[0] + tv[1]*tv[1] + tv[2]*tv[2]);
p1[0] = tv[0]/len;
p1[1] = tv[1]/len;
p1[2] = tv[2]/len;

v[0] = p2[0] + p4[0];
v[1] = p2[1] + p4[1];
v[2] = p2[2] + p4[2];
C_gm_tran3d( 2, mtrx, tv, v);
tv[0] -= o[0];
tv[1] -= o[1];
tv[2] -= o[2];
len = sqrt(tv[0]*tv[0] + tv[1]*tv[1] + tv[2]*tv[2]);
p2[0] = tv[0]/len;
p2[1] = tv[1]/len;
p2[2] = tv[2]/len;

v[0] = p3[0] + p4[0];
v[1] = p3[1] + p4[1];
v[2] = p3[2] + p4[2];
C_gm_tran3d( 2, mtrx, tv, v);
tv[0] -= o[0];
tv[1] -= o[1];
tv[2] -= o[2];
len = sqrt(tv[0]*tv[0] + tv[1]*tv[1] + tv[2]*tv[2]);
p3[0] = tv[0]/len;
p3[1] = tv[1]/len;
p3[2] = tv[2]/len;
```

```
C_ut_dpsto ( 3, o, p4);
return 0;
}
```

APPENDIX 6:
```
/*******************************************************************
 *                                                                 *
 * HEADER FILE FOR MICRO CADAM WRITTEN C LANGUAGE                  *
 *                                                                 *
 *******************************************************************
 *                                                                 *
 * HEADER FILE NAME: PARAM.H                                       *
 *                                                                 *
 *******************************************************************
 *                                                                 *
 * IDENTIFICATION:                                                 *
 *                                                                 *
 *     AUTHOR .......... Frank Niu                                 *
 *     DATE  ..........  10/15/89                                  *
 *                                                                 *
 *     MODIFIED ........ Allen Chen                                *
 *     DATE    ........  4/16/90                                   *
 *     NATURE  ........  Add Spline                                *
 *                                                                 *
 *     MODIFIED ........                                           *
 *     DATE    ........                                            *
 *     NATURE  ........                                            *
 *                                                                 *
 *******************************************************************
 *                                                                 *
 * NOTE ON USE:                                                    *
 *                                                                 *
 *******************************************************************/ define   SSIZE    20
define   LSIZE    400
#define   ESIZE    600
#define   VSIZE    600
#define   BSIZE    50
#define   CHLDSZ   100
```

```
#define   SD_LINE     1
#define   SD_CIRCLE   2
define   SD_SPLINE   4 define   F0   0.4142136
define   F1   0.5857864 struct  LOOP_LIST
{
    short       EdgeIndex;
    struct      LOOP_LIST   *back, *next;
    struct      LOOP_LIST   *link;
    short       used;
};

struct  VertexTable
{
    short       f1, f2, f3;
    double      x, y, z;
};

struct  LINE
{
    short       StartVertex;
    short       EndVertex;
};

struct  CIRCLE
{
    short       fid;
    short       StartVertex;
    short       EndVertex;
    double      A1, A2;
    struct      POINT *Vertics[13];
};
```

```
struct  SPLINE
        {
        short       fid;           /* face number */
        short       StartVertex;
        short       EndVertex;
        struct      BSPLINE Bspl;
        };

struct  EdgeTable
        {
        short       LeftLoop;
        short       RightLoop;
        short       EdgeType;
        struct      LINE    *Line;
        struct      CIRCLE  *Circle;
        struct      SPLINE  *Spline;
        };

struct  LoopTable
        {
        short       FaceIndex;
        short       NumberEdges;
        struct      LOOP_LIST *ListHead;
        struct      LOOP_LIST *ListPtr;
        short       DividingLoopEdge;
        struct      LoopTable *Ploop;
        struct      LoopTable *Cloop;
        };

struct  SolidTable
        {
        char        name[40];
        short       NumberLoops;
        short       NumberEdges;
        short       NumberVertics;
        struct      LoopTable  *LoopTable  [LSIZE];
        struct      EdgeTable  *EdgeTable  [ESIZE];
```

```
   struct  VertexTable  *VertexTable[VSIZE];
   };

/************************************************************/
/*                                                          */
/*                      hole.h                              */
/*                                                          */
/************************************************************/ struct POLYNODE
   {
   float   x,y,z;
   short   Show_Edge;
   struct  POLYNODE *next, *back;
   };

struct POLYGON_AND_BOX
   {
   struct  POLYNODE *header, *ptr;
   float   Xmin, Xmax, Ymin, Ymax, Zmin, Zmax;
   };

struct POLYGONS
   {
   struct  POLYGON_AND_BOX  *Parent;
   short   NumberChildren;
   struct  POLYGON_AND_BOX  *Children[CHLDSZ];
   };

struct INTERSECTION
   {
   struct  POLYNODE   *NodePtr;
   short   PolyIndex;
   };
```

APPENDIX 7:
```
/*****************************************************************
 *                                                               *
 *   Function name  : Build_xxxxxx_Color_Map ()                  *
 *                                                               *
 *****************************************************************
 *                                                               *
 *   Category       : COLOR MAP MANAGEMENT                       *
 *                                                               *
 *****************************************************************
 *                                                               *
 *   Description    : Three major routines set up the color map  *
 *                    for three shading modes.                   *
 *                                                               *
 *****************************************************************
 *                                                               *
 *   Input          :                                            *
 *                    ----------                                 *
 *                    ----------                                 *
 *                                                               *
 *****************************************************************
 *                                                               *
 *   Output         :                                            *
 *                    ----------                                 *
 *                    ----------                                 *
 *                                                               *
 *****************************************************************
 *                                                               *
 *   Input/Output   :                                            *
 *                    ----------                                 *
 *                    ----------                                 *
 *                                                               *
 *****************************************************************
 *                                                               *
 *   Function returns :                                          *
 *                    ---------------                            *
 *                    ---------------                            *
 *                                                               *
 *****************************************************************
 *                                                               *
 *   Identification :                                            *
 *                     AUTHOR ............ Chris Chen            *
 *                                                               *
```

```
/***************************************************************
 *                                                              *
 *  DATE ............ 04/12/90                                  *
 *                                                              *
 *  MODIFIED BY ..... Allen Chen                                *
 *  DATE ............ 04/27/90                                  *
 *  NATURE (#1)...... modify cal_indices                        *
 *                                                              *
 ****************************************************************
 *                                                              *
 *  Calls        :   _____                                   *
 *                                                              *
 ****************************************************************
 *                                                              *
 *  Called by    :   _____                                   *
 *                                                              *
 ****************************************************************
 *                                                              *
 *  Algorithm    :  Color map has been devided into three       *
 *                  different sections, CADAM MAP, USERS MAP,   *
 *                  and SHADE MAP.  Their sizes are defined     *
 *                  in file "shade.h".                          *
 *                  CADAM MAP contains the RGB values of 16     *
 *                  CADAM colors.                               *
 *                                                              *
 *                  USERS MAP stores the RGB values of those    *
 *                  colors used by button, window, icon, and    *
 *                  text.  Currently, 16 entries are allocated  *
 *                  for USERS MAP.                              *
 *                                                              *
 *                  SHADE MAP includes 216 entries which are    *
 *                  the shading colors for surface display.     *
 *                                                              *
 *                  In Dither shading mode, 216 "fixed colors"  *
 *                  are reserved for HOOPS standard shading.    *
 *                                                              *
 *                  In Constant shading mode, 216 colors are    *
 *                  separated into 12 sections for the default  *
 *                  color and 11 CADAM object colors.  Each     *
```

```
*                                                                               *
*       section contains 18 shade levels of the                                 *
*       standard colors.                                                        *
*                                                                               *
*       In Smooth shading mode, all colors are                                  *
*       the different shade level of the selected                               *
*       shading color (first entry of USERS MAP).                               *
*                                                                               *
*****************************************************************              *
*                                                                               *
*       Glossary        :                                                       *
*                       -----                                                   *
*                                                                               *
*****************************************************************              *
*                                                                               *
*       Notes on use    : Normally, two colors are reserved for the             *
*                         display of mouse cursor, so the total                 *
*                         number of the available color is 254.                 *
*                         These colors can be classified into three             *
*                         categories :                                          *
*                                                                               *
*                         The "regular color" is genererated by the             *
*                         use of Set_Color_By_Value routines.  Each             *
*                         color of different RGB value occupy one               *
*                         entry on the hardware color lookup table,             *
*                         and their value can not be changed or                 *
*                         delete by any HOOPS routine.                          *
*                                                                               *
*                         The "fixed color" is used by the HOOPS to             *
*                         generate the dither shading.                          *
*                                                                               *
*                         The "map color" is stored in the virtual              *
*                         color map of each segment.  Its RGB value             *
*                         can be changed by the programmer.                     *
*                                                                               *
*                         Due to the arrangement of the color map,              *
*                         there is only one shading mode can exist              *
*                         at any time.                                          *
*                                                                               *
```

```
*
* * * * * * * * * * * * * * * * * * * * * * * * * * * * * * * * * * * * *
#include <stdio.h>
#include <math.h>
#include "constd.h"
#include "color.h"
#include "shade.h"
#include "mltwdw.h"

/*-----------------------------------------------------------------*/
/*       RGB color value for 64 EGA emulation colors               */
/*                                                                 */
/*-----------------------------------------------------------------*/ short color_table[64][3] =
{
   {  0, 0, 0},{ 0, 0, 0,66},{ 0,66, 0},{ 0,66,66},{66, 0, 0},{66, 0,66},{66,66, 0},{66,66,66},
   {  0, 0,33},{ 0, 0,99},{ 0,66,33},{ 0,66,99},{66, 0,33},{66, 0,99},{66,66,33},{66,66,99},
   {  0,33, 0},{ 0,33,66},{ 0,99, 0},{ 0,99,66},{66,33, 0},{66,33,66},{66,99, 0},{66,99,66},
   {  0,33,33},{ 0,33,99},{ 0,99,33},{ 0,99,99},{66,33,33},{66,33,99},{66,99,33},{66,99,99},
   { 33, 0, 0},{33, 0,66},{33,66, 0},{33,66,66},{99, 0, 0},{99, 0,66},{99,66, 0},{99,66,66},
   { 33, 0,33},{33, 0,99},{33,66,33},{33,66,99},{99, 0,33},{99, 0,99},{99,66,33},{99,66,99},
   { 33,33, 0},{33,33,66},{33,99, 0},{33,99,66},{99,33, 0},{99,33,66},{99,99, 0},{99,99,66},
   { 33,33,33},{33,33,99},{33,99,33},{33,99,99},{99,33,33},{99,33,99},{99,99,33},{99,99,99}
};

RGB   Color_Map[COLOR_MAP_SIZE];
```

```
void   MC_Build_Color_Map ();
void   Show_Color_By_RGB (short index, short *R, short *G, short *B);
void   Show_Color_By_Value (short index, short *value);
void   Set_Color_By_RGB (short index, short R, short G, short B);
void   Set_Color_By_Value (short index, short value);

static void   Build_Normal_Color_Map ();
static void   Build_Dither_Color_Map ();
static void   Build_Constant_Color_Map ();
static void   Build_Gouraud_Color_Map ();
static void   Set_Cadam_Color_Map ();
static void   Set_Users_Color_Map ();

/*--------------------------------------------------*/
/*                                                  */
/*    Initialize_Color_Map : Initialize color map.  */
/*                                                  */
/*--------------------------------------------------*/
void Initialize_Color_Map (short level)
{
   switch (level)
   {
   case 0 : COLOR.clmod    = 0;          /* Modal color number */
            COLOR.clcur    = 1;          /* Current color number on side bar */ case 1 : COLOR.clmct[0] = 63;
            COLOR.clmct[1] = 26;
            COLOR.clmct[2] = 63;
            COLOR.clmct[3] = 0;
            COLOR.clmct[4] = 0;
            COLOR.clmct[5] = 18;
            COLOR.clmct[6] = 27;
            COLOR.clmct[7] = 36;
            COLOR.clmct[8] = 54;
            COLOR.clmct[9] = 37;
```

```
            COLOR.clmct[10] = 26;
            COLOR.clmct[11] = 60;
            COLOR.clmct[12] = 52;
            COLOR.clmct[13] = 25;
            COLOR.clmct[14] =  9;
            COLOR.clmct[15] = 40;

case 2 : COLOR.cldef[0] = COLOR.clmct[0];    /* DEFAULT COLOR    */
            COLOR.cldef[1] = 0;
            COLOR.clbrt[0] = COLOR.clmct[1];    /* BRIGHT  COLOR    */
            COLOR.clbrt[1] = 1;
            COLOR.clcsr[0] = COLOR.clmct[2];    /* CURSOR COLOR     */
            COLOR.clcsr[1] = 2;
            COLOR.clblk[0] = COLOR.clmct[3];    /* MESSAGE BACKGROUND */
            COLOR.clblk[1] = 3;
            COLOR.clbgr[0] = COLOR.clmct[4];    /* MODEL BACKGROUND */
            COLOR.clbgr[1] = 4;

COLOR.clshd    = 57;                /* SHADING COLOR    */

}

Set_Cadam_Color_Map ();
  Set_Users_Color_Map ();
  MC_Build_Color_Map ();
}

/*----------------------------------------------------------------------*/
/*                                                                      */
/*    Show_Color_By_RGB : Inquire color RGB value of a color index.     */
/*                                                                      */
/*----------------------------------------------------------------------*/
void Show_Color_By_RGB (short index, short *R, short *G, short *B)
{
  *R = color_table[COLOR.clmct[index]][0];
  *G = color_table[COLOR.clmct[index]][1];
```

```
    *B = color_table[COLOR.clmct[index]][2];
}
/*--------------------------------------------------------------*/
/*                                                              */
/*   Show_Color_By_Value : Inquire color value of a color index.*/
/*                                                              */
/*--------------------------------------------------------------*/
void Show_Color_By_Value (short index, short *value)
{
    if (index == 16) *value = COLOR.clshd;
    else             *value = COLOR.clmct[index];
}
/*--------------------------------------------------------------*/
/*                                                              */
/*   Set_Color_By_RGB : Modify color RGB value of a color index.*/
/*                                                              */
/*--------------------------------------------------------------*/
void Set_Color_By_RGB (short index, short R, short G, short B)
{
    color_table[COLOR.clmct[index]][0] = R;
    color_table[COLOR.clmct[index]][1] = G;
    color_table[COLOR.clmct[index]][2] = B;
}
/*--------------------------------------------------------------*/
/*                                                              */
/*   Set_Color_By_Value : Modify color value of a color index.  */
/*                                                              */
/*--------------------------------------------------------------*/
void Set_Color_By_Value (short index, short value)
{
    if (index == 16) COLOR.clshd = value;
```

```
         else
                   COLOR.clmct[index] = value;

Color_Map[CADAM_MAP0+index].R = color_table[value][0] / 99.0;
Color_Map[CADAM_MAP0+index].G = color_table[value][1] / 99.0;
Color_Map[CADAM_MAP0+index].B = color_table[value][2] / 99.0;

HC_QModify_Color_Map_By_Value ("?picture", (int)index, "RGB",
                               (int)1, &Color_Map[index].R);

switch (SHADE.mode)
{
    case -1: break;
    case  0: break;
    case  1: break;
    case  2: if (index > 4) Build_Constant_Color_Map ();
             break;
    case  3: if (index == 16) Build_Gouraud_Color_Map ();
             break;
    default: /* do nothing */;
}

/*-----------------------------------------------------------------------*/
/*                                                                       */
/*  MC_Build_Color_Map () : Build color map for any shading condition*/
/*                                                                       */
/*-----------------------------------------------------------------------*/
void MC_Build_Color_Map ()
{
    switch (SHADE.mode)
    {
        case -1:
        case  0: Build_Normal_Color_Map ();
                 break;
        case  1: Build_Dither_Color_Map ();
                 break;
        case  2: Build_Constant_Color_Map ();
```

```
             break;
    case  3:  Build_Gouraud_Color_Map ();
              break;
    default: /* do nothing */;
    }
}

/*------------------------------------------------------*/
/*                                                      */
/*   Build_Normal_Color_Map : Set up normal wireframe color map.  */
/*                                                      */
/*------------------------------------------------------*/ static void Build_Normal_Color_Map ()
{
    if (COLOR.cldpf <= 16)
    {
        HC_Open_Segment ("?picture");
            HC_UnSet_Color_Map ();
            HC_Set_Driver_Options ("fixed colors = 0");
            HC_Set_Color_Map_By_Value ("RGB", CADAM_MAP_SIZE, Color_Map);
        HC_Close_Segment();
    }
    else
    {
        HC_Open_Segment ("?picture");
            HC_UnSet_Color_Map ();
            HC_Set_Color_Map_By_Value ("RGB", BASIC_MAP_SIZE, Color_Map);
#ifdef NTH
            HC_Set_Driver_Options ("fixed colors = 125");
#else
            HC_Set_Driver_Options ("fixed colors = 216");
#endif
        HC_Close_Segment();
    }
}
```

```
/*-------------------------------------------------------------*/
/*                                                             */
/*    Build_Dither_Color_Map : Set up dither shading mode color map.    */
/*                                                             */
/*-------------------------------------------------------------*/ static void Build_Dither_Color_Map ()
{
    if (COLOR.cldpf <= 16)
    {
        HC_Open_Segment ("?picture");
            HC_UnSet_Color_Map ();
            HC_Set_Color_Map_By_Value ("RGB", COLOR.cldpf-8, Color_Map);
            HC_Set_Driver_Options ("fixed colors = 8");
        HC_Close_Segment();
    }
    else
    {
        HC_Open_Segment ("?picture");
            HC_UnSet_Color_Map ();
            HC_Set_Color_Map_By_Value ("RGB", BASIC_MAP_SIZE, Color_Map);
#ifdef NTH
            HC_Set_Driver_Options ("fixed colors = 125");
#else
            HC_Set_Driver_Options ("fixed colors = 216");
#endif
        HC_Close_Segment();
    }
}

/*-------------------------------------------------------------*/
/*                                                             */
/*    Build_Constant_Color_Map : Set up constant shading color map.    */
/*                                                             */
/*-------------------------------------------------------------*/
```

```
static void Build_Constant_Color_Map ()
{
    short i, j, k, lstart, index;
    float x;

if (COLOR.cldpf <= 16) return;

/*..........................................................
     : by A. Chen
     :
     : MAXLEV : The maximum number of gray level.
     :          This value is defined in file "shade.h"
     : LEVEL  : number of gray levels to be used for fine shading
     ..........................................................
    */

/* Calculate gray level for default & 11 CADAM colors */ lstart = MAXLEV - LEVEL;
    for (i = 0; i <= 11; i++)
    {
        if (i == 0) index = COLOR.cldef[0];
        else        index = COLOR.clmct[i+4];

for (j = SHADE_MAP0 + i*LEVEL, k = 0; k < LEVEL; j++, k++)
        {
            x = 0.01 * (lstart + k) / MAXLEV;
            Color_Map[j].R = color_table[index][0] * x;
            Color_Map[j].G = color_table[index][1] * x;
            Color_Map[j].B = color_table[index][2] * x;
        }
    }

HC_Open_Segment ("?picture");
    HC_UnSet_Color_Map ();
    HC_Set_Driver_Options ("fixed colors = 0");
```

```
        HC_Set_Color_Map_By_Value ("RGB", COLOR_MAP_SIZE, Color_Map);
        HC_Close_Segment();
}

/*--------------------------------------------------------------*/
/*                                                              */
/*      Build_Gouraud_Color_Map : Set up Gouraud shading mode color map.  */
/*                                                              */
/*--------------------------------------------------------------*/ static void Build_Gouraud_Color_Map ()
{
        short   i;
        RGB     Camb, M;
        float   pai, Rstep, Gstep, Bstep;
        float   cosa[GOURAUD_COLOR_SIZE];
        float   PI = 3.1415926;
        float   range;
        float   amb;

if (COLOR.cldpf <= 16) return;

/*..............................................................
 : Allen Chen, 4/25/90
 : amb : ambient factor will be referenced as a
 : global variable which can be defined by users.
 : The factor makes the range of gouraud color map
 : run between amb and 1.0. It discards the colors
 : under amb and gives more gray leves to visible
 : range.
 : if amb is defined as global variable then the
 : color map will range from amb to somewhere close
 : to 1.0. Thus, the routine calculate_indices()
 : shall be rewritten to produce correct indices.
 : For now, the value of amb is set to 0.0.
 :..............................................................
```

```
*/
amb = 0.0;
range = (float)((GOURAUD_COLOR_SIZE - 1) * (short)100);
pai = (float)(PI_D / (double) ((short)GOURAUD_COLOR_SIZE * (short)2));

for (i= 0; i < GOURAUD_COLOR_SIZE; i++)
    cosa[GOURAUD_COLOR_SIZE-1-i] = pow (cos (i*pai), 5);
/*................................................
 : Allen Chen, 4/25/90
 : find ambient color of RGB.
 : RGB step is adjusted by ambient color
 :...............................................
*/
Camb.R = color_table[COLOR.clshd][0] * amb;
Camb.G = color_table[COLOR.clshd][1] * amb;
Camb.B = color_table[COLOR.clshd][2] * amb;

Rstep = (color_table[COLOR.clshd][0] - Camb.R) / range;
Gstep = (color_table[COLOR.clshd][1] - Camb.G) / range;
Bstep = (color_table[COLOR.clshd][2] - Camb.B) / range;

for (i = 0; i < GOURAUD_COLOR_SIZE; i++)
{
    M.R = i * Rstep + Camb.R;
    M.G = i * Gstep + Camb.G;
    M.B = i * Bstep + Camb.B;
    Color_Map[SHADE_MAP0 + i].R = M.R + (1-M.R) * cosa[i] * 0.5;
    Color_Map[SHADE_MAP0 + i].G = M.G + (1-M.G) * cosa[i] * 0.5;
    Color_Map[SHADE_MAP0 + i].B = M.B + (1-M.B) * cosa[i] * 0.5;

#ifdef DEBUG
    printf("colormap[%d]=(%lf,%lf,%lf)\n", COLOR_MAP_SIZE-1-i,
        Color_Map[SHADE_MAP0 + i].R,
        Color_Map[SHADE_MAP0 + i].G,
        Color_Map[SHADE_MAP0 + i].B);
#endif
```

```c
    HC_Open_Segment ("?picture");
    HC_UnSet_Color_Map ();
    HC_Set_Driver_Options ("fixed colors = 0");
    HC_Set_Color_Map_By_Value ("RGB", COLOR_MAP_SIZE, Color_Map);
    HC_Close_Segment();
}

/*--------------------------------------------------------------*/
/*                                                              */
/*    Set_Cadam_Color_Map : Set sixteen CADAM basic color map.  */
/*                                                              */
/*--------------------------------------------------------------*/
static void Set_Cadam_Color_Map ()
{
    short i;

for (i = 0; i < CADAM_MAP_SIZE; i++)
    {
        Color_Map[CADAM_MAP0+i].R = color_table[COLOR.clmct[i]][0] / 99.0;
        Color_Map[CADAM_MAP0+i].G = color_table[COLOR.clmct[i]][1] / 99.0;
        Color_Map[CADAM_MAP0+i].B = color_table[COLOR.clmct[i]][2] / 99.0;
    }
}

/*--------------------------------------------------------------*/
/*                                                              */
/*    Set_Users_Color_Map : Set user shading color map.         */
/*                                                              */
/*--------------------------------------------------------------*/
static void Set_Users_Color_Map ()
{
    short i;
```

```
float gray;
RGB   white, brite;

Color_Map[USERS_MAP0].R = color_table[COLOR.clshd][0] / 99.0;
Color_Map[USERS_MAP0].G = color_table[COLOR.clshd][1] / 99.0;
Color_Map[USERS_MAP0].B = color_table[COLOR.clshd][2] / 99.0;

/* set 5 gray shades */
white.R = 0.75;
white.G = 1.0;
white.B = 1.0;
brite.R = color_table[COLOR.clbrt[0]][0] / 99.0;
brite.G = color_table[COLOR.clbrt[0]][1] / 99.0;
brite.B = color_table[COLOR.clbrt[0]][2] / 99.0;
for (i = 1; i <= 5; i++)
{
    switch (i)
    {
        case 1: gray = 0.125; break;
        case 2: gray = 0.195; break;
        case 3: gray = 0.306; break;
        case 4: gray = 0.479; break;
        case 5: gray = 0.75;
    }
    Color_Map[USERS_MAP0+i].R = white.R * gray;
    Color_Map[USERS_MAP0+i].G = white.G * gray;
    Color_Map[USERS_MAP0+i].B = white.B * gray;
    Color_Map[USERS_MAP0+5+i].R = brite.R * gray;
    Color_Map[USERS_MAP0+5+i].G = brite.G * gray;
    Color_Map[USERS_MAP0+5+i].B = brite.B * gray;
}
for (i = USERS_MAP0+11; i < USERS_MAP_SIZE; i++)
{
    Color_Map[USERS_MAP0+i].R = 1.0;
    Color_Map[USERS_MAP0+i].G = 1.0;
    Color_Map[USERS_MAP0+i].B = 1.0;
}
}
```

APPENDIX 8:
/****************************************************************
*                                                                *
*                      Calculate Indices                         *
*                                                                *
*----------------------------------------------------------------*
* The routine returns the index to the color map for the given Normal *
* and my_lights[4].                                              *
*                                                                *
* eye vector: come form window matrix (zvector)                  *
* light vector: was transformed form world system to window system (active) *
*                                                                *
*----------------------------------------------------------------*
* Author      : Allen Chen                                       *
*                                                                *
*                                                                *
*****************************************************************
*/ void calculate_indices( Normal, my_lights, index )
double  Normal[];
VECTOR  my_lights[4];
short   *index;

{

VECTOR eye, refraction, norm;
float  amb, difus;
float  t1, t2, coso, cosa, cosr, ta;

float  max_color;
short  light_num;
float  range;

```
/*..........................
 :..........................
 */
range   = (float) (GOURAUD_COLOR_SIZE - 1);
amb     = 0.1;
difus   = 0.5;

eye.x = WDW3D.wzvec[0];
eye.y = WDW3D.wzvec[1];
eye.z = WDW3D.wzvec[2];
norm.x = (float) Normal[0];
norm.y = (float) Normal[1];
norm.z = (float) Normal[2];

dot_vectors( &cosr, eye, norm );
if (cosr <= 1.e-3) cosr = 0.0;

max_color = 0.0;
for (light_num=0; light_num< 4; light_num++)
{
    if( SHADE.light[light_num] == ON )
    {
        coso = my_lights[light_num].x*norm.x
             + my_lights[light_num].y*norm.y
             + my_lights[light_num].z*norm.z;

if ((coso <= 0.0 ) || (coso > 1.0))  coso = 0.0;

refraction.x = -my_lights[light_num].x + 2*coso * norm.x;
        refraction.y = -my_lights[light_num].y + 2*coso * norm.y;
        refraction.z = -my_lights[light_num].z + 2*coso * norm.z;
        t1 = sqrt ( refraction.x * refraction.x +
                    refraction.y * refraction.y +
                    refraction.z * refraction.z);

refraction.x /= t1;
        refraction.y /= t1;
```

```
    refraction.z /= t1;

dot_vectors ( &cosa, refraction, eye );

if ((coso > 0.0 ) && (cosa > 0.0) && (cosr > 0.0))
    {
        ta = coso * cosa;
        cosa = ta*ta*cosa;
    }
    else
    {
        cosa = 0.0;
    } t1 = amb + coso * ( 1.0 - amb ) * difus;    /*ambient + diffuse*/
    t2 = t1 + ( 1.0 - t1 ) * cosa;              /*complement factor */
}
else
    t2 = amb;

if( t2 > max_color ) max_color = t2;
}

*index = (short)SHADE_MAP0 + (short)(max_color * range + (float)0.5);

}
```

APPENDIX 9:
```
/*
: Allen Chen 8/23/90
:
: The files include this header
:
*/ ifndef BSPLINE_H_FILE
define BSPLINE_H_FILE define MAXSplineKnots 50
define MAXKnots 56
#define MAXControlPoints 52
#define GLOBAL_TO_LOCAL 1
define LOCAL_TO_GLOBAL 2 struct BSPLINE
{
/*
: A. Chen
:
: Attributes
:   Bclosed      0/open          1/closed
:   Bperiodic    0/nonperiodic   1/periodic
:   Brational    0/nonrational   1/rational
:   Bplanar      0/nonplanar     1/planar
:
: Data
:   Order : order of the B spline
:   Nknots : the number of knots in the array KnotSequence[]
:   Ncp   : the number of control points in ControlPoints[]
:   Start : starting knot sequece of the curve (relimit data)
:   End   : ending knot sequence of the curve (relimit data)
:
*/
```

```
    short    Bclosed;
    short    Bperiodic;
    short    Brational;
    short    Bplanar;
    short    Order;
    short    Nknots;
    short    Ncp;
    double   Start, End;
    double   KnotSequence [MAXknots];
    struct POINT *ControlPoints [MAXControlPoints];
};

struct SURFACE
{
    short    Udisp, Wdisp;
    short    BUclosed,  BWclosed;
    short    BUperiodic, BWperiodic;
    short    BUrational, BWrational;
    short    Uorder, Worder;
    short    NknotsU, NknotsW;
    double   KnotSequenceU[MAXknots], KnotSequenceW[MAXknots];
    struct POINT *ControlPoints[MAXControlPoints][MAXControlPoints];
};

struct RULEDSURFACE
{
    short    Udisp, Wdisp;
    struct BSPLINE  B_Spline1,  B_Spline2;
};

struct ROTATIONAL_SURFACE
{
    double A[3], B[3], C[3], Origin[3];
    double A1, A2;
    short  Udisp, Wdisp;
    struct BSPLINE  *B_Spline;
};
```

```
struct EDGE_SURFACE
{
short  Udisp, Wdisp;
struct BSPLINE  B_Spline[4];
};

#endif
```

APPENDIX 10:

```
short C_sf_mormbsf(ptr)
short ptr[];
{
    short   ret;
    short   i,j;
    short   w2,w,j2;
    double  tx,ty,tz;
    struct SURFACE *SkinSurface;

SkinSurface = (struct SURFACE *) malloc (sizeof (struct SURFACE));
    if (SkinSurface == 0) return 200;

ret = ssr_GetSurfaceData( ptr, SkinSurface );
    if( ret == 0 )
    {
        w = SkinSurface->NknotsW-4;
        w2 = w/2;
        for( i=0; i<SkinSurface->NknotsU-4; i++)
            for( j=0; j<w2; j++ )
            {
                j2 = w-j-1;
                tx = SkinSurface->ControlPoints[i][j]->x;
                ty = SkinSurface->ControlPoints[i][j]->y;
                tz = SkinSurface->ControlPoints[i][j]->z;
                SkinSurface->ControlPoints[i][j]->x = SkinSurface->ControlPoints[i][j2]->x;
                SkinSurface->ControlPoints[i][j]->y = SkinSurface->ControlPoints[i][j2]->y;
                SkinSurface->ControlPoints[i][j]->z = SkinSurface->ControlPoints[i][j2]->z;
                SkinSurface->ControlPoints[i][j2]->x = tx;
                SkinSurface->ControlPoints[i][j2]->y = ty;
                SkinSurface->ControlPoints[i][j2]->z = tz;
            } w = SkinSurface->NknotsW;
        w2 = w/2;
        tz = SkinSurface->KnotSequenceW[w-1];
```

```
   for( j=0; j<w2; j++ )
   {
      j2 = w-j-1;
      tx = SkinSurface->KnotSequenceW[j];
      SkinSurface->KnotSequenceW[j] = tz - SkinSurface->KnotSequenceW[j2];
      SkinSurface->KnotSequenceW[j2] = tz - tx;
   }
   if ((w%2) == 1)
      SkinSurface->KnotSequenceW[w2] = tz - SkinSurface->KnotSequenceW[w2];

C_mi_sfstobsf((short)SF_REPLC,SkinSurface,ptr);
   free_skincntl(SkinSurface);

free(SkinSurface);
   return 0;
}
undef SF_STORE
undef SF_REPLC short C_sf_rnormbnd(ptr)
short ptr[];
{
   short ret;
   struct EDGE_SURFACE *EdgeSurface;

EdgeSurface = (struct EDGE_SURFACE *) malloc (sizeof(struct EDGE_SURFACE));
   if (EdgeSurface == 0) return 200;

ret = getbdrysf(ptr, EdgeSurface);

if (ret == 0)
   {
      bsflip(&EdgeSurface->B_Spline[0]);
      bsflip(&EdgeSurface->B_Spline[1]);
      ret = swap_bspl(&EdgeSurface->B_Spline[2],&EdgeSurface->B_Spline[3]);
      if (ret != 0) return ret;
```

```
        ret =  C_mi_sfstobnd (((short)SF_REPLC, EdgeSurface, ptr );
        freeEdgeSurf(EdgeSurface);
    }
    free(EdgeSurface);

return ret;
} undef SF_STORE
undef SF_REPLC short C_sf_rnormrul(ptr)
short ptr[];
{
    struct RULEDSURFACE *RuledSurface;
    short ret;

RuledSurface = (struct RULEDSURFACE *) malloc (sizeof(struct RULEDSURFACE));
    if (RuledSurface == 0) return 200;

ret = getrulsf(ptr, RuledSurface);
    if (ret == 0)
    {
        bsflip(&RuledSurface->B_Spline1);
        bsflip(&RuledSurface->B_Spline2);
        ret = C_mi_sfstorul((short)1, RuledSurface, ptr);

(void) free_CntlPnts(&RuledSurface->B_Spline1);
        (void) free_CntlPnts(&RuledSurface->B_Spline2);
    }
    free(RuledSurface);
    return ret;
}
```

```c
short C_sf_rnormrot(ptr)
short ptr[];
{
    struct ROTATIONAL_SURFACE *rotsrf;
    short ret;

rotsrf = (struct ROTATIONAL_SURFACE *) malloc (sizeof(struct ROTATIONAL_SURFACE));
    if (rotsrf == 0) return 200;

ret = ssr_GetRotational( ptr, rotsrf );
    if( ret == 0 )
    {
        bsflip(rotsrf->B_Spline);
        ret = C_mi_sfstorev((short)SF_REPLC,rotsrf,ptr);
        free_CntlPnts(rotsrf->B_Spline);
    }
    free(rotsrf);

return ret;
}
```

Having thus described our invention, what we claim as new, and desire to secure by Letters Patent is:

1. Apparatus for performing a set of display operations to transform orthogonal views of a two dimensional drawing into a solid representing the two dimensional drawing into a solid representing the two dimensional drawing views on a graphic display, comprising:

(a) means for storing a plurality of two dimensional drawings representative of various views of an object including face views and corresponding profile views, the face views and the corresponding profile views being orthogonal to one another;

(b) pointing means for selecting a first two dimensional face for the solid from a first two dimensional drawing, selecting a second two dimensional face for the solid from a second two dimensional drawing, selecting a first profile corresponding to the first two dimensional face, the first profile being an orthogonal view of the first two dimensional face, selecting a second profile corresponding to the second two dimensional face, the second profile being an orthogonal view of the second two dimensional face; and (c) processor means for transforming and displaying the first two dimensional face, the first profile, the second two dimensional face, and the second profile as a solid on the graphic display.

2. Apparatus as recited in claim 1, further comprising date structure means for storing two dimensional drawing information including face views and profile views.

3. Apparatus as recited in claim 1, further comprising data structure means for storing solid information.

4. Apparatus as recited in claim 1, further comprising means for specifying the location where the solid should appear on the graphic display.

5. A method for performing a set of display operations to transform orthogonal views of a two dimensional drawing into a solid representing the two dimensional drawing views on a graphic display, comprising the steps of:

(a) storing a plurality of two dimensional drawings representative of various views of an object including face views and corresponding profile views, the face views and the corresponding profile views being orthogonal to one another;

(b) selecting a first two dimensional face for the solid from a first two dimensional drawing using a pointing means;

(c) selecting a second two dimensional face for the solid from a second two dimensional drawing using the pointing means;

(d) selecting a first profile corresponding to the first two dimensional face using the pointing means, the first profile being an orthogonal view of the first two dimensional face;

(e) selecting a second profile corresponding to the second two dimensional face using the pointing means, the second profile being an orthogonal view of the second two dimensional face; and (f) transforming and displaying the first two dimensional face, the first profile, the second two dimensional face, and the second profile as a solid on the graphic display.

6. A method as recited in claim 5, further comprising storing two dimensional drawing information including face views and profile views in a data structure.

7. A method as recited in claim 5, further comprising storing solid information in a data structure.

8. A method as recited in claim 5, further comprising specifying the location where the solid should appear on the graphic display.

\* \* \* \* \*

UNITED STATES PATENT AND TRADEMARK OFFICE
CERTIFICATE OF CORRECTION

PATENT NO. : 5,561,748
DATED : October 1, 1996
INVENTOR(S) : NIU ET AL.

It is certified that error appears in the above-indentified patent and that said Letters Patent is hereby corrected as shown below:

Column 2, line 23: replace "end" with --and--.

Column 8, line 19: replace "I[21]" with --I[2]--.

Signed and Sealed this

Fourth Day of March, 1997

*Attest:*

BRUCE LEHMAN

*Attesting Officer*　　　*Commissioner of Patents and Trademarks*